United States Patent
Pop et al.

(10) Patent No.: US 9,097,103 B2
(45) Date of Patent: Aug. 4, 2015

(54) METHODS AND APPARATUS FOR PLANNING AND DYNAMICALLY UPDATING SAMPLING OPERATIONS WHILE DRILLING IN A SUBTERRANEAN FORMATION

(75) Inventors: Julian J. Pop, Houston, TX (US); Yong Chang, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1056 days.

(21) Appl. No.: 13/126,540

(22) PCT Filed: Oct. 28, 2009

(86) PCT No.: PCT/US2009/062303
§ 371 (c)(1),
(2), (4) Date: Jul. 25, 2011

(87) PCT Pub. No.: WO2010/062635
PCT Pub. Date: Jun. 3, 2010

(65) Prior Publication Data
US 2011/0266056 A1    Nov. 3, 2011

Related U.S. Application Data

(60) Provisional application No. 61/110,857, filed on Nov. 3, 2008.

(51) Int. Cl.
*G06G 7/48* (2006.01)
*G06G 7/50* (2006.01)
*E21B 49/08* (2006.01)

(52) U.S. Cl.
CPC ........................ *E21B 49/08* (2013.01)

(58) Field of Classification Search
CPC ......................................... E21B 49/08
USPC ............................................ 703/9–10; 702/6
See application file for complete search history.

(56) References Cited

U.S. PATENT DOCUMENTS 4,794,534 A    12/1988  Millheim
5,992,519 A    11/1999  Ramakrishnan et al.
(Continued)

FOREIGN PATENT DOCUMENTS

EP    1712733 A1    10/2006
RU    2502870 C2    12/2013

OTHER PUBLICATIONS

Allen, et al., "Invasive Revisited", Oilfield Review, Jul. 1991, pp. 10-23.
(Continued)

*Primary Examiner* — Eunhee Kim
(74) *Attorney, Agent, or Firm* — Cathy Hewitt; Kenny Kincaid

(57) ABSTRACT

Methods and apparatus for planning and dynamically updating sampling operations while drilling in a subterranean formation are described. An example method of planning a sampling while drilling operation for a subterranean formation includes identifying a plurality of processes and related parameters, the processes including drilling and sampling processes and the related parameters including drilling and sampling parameters. The example method also involves processing the parameters for each of the processes via a simulation engine to generate predictions associated with sampling the formation, the simulation engine including at least one of a wellbore hydraulics simulator, a mudcake simulator, a formation flow simulator, or a tool response simulator. The example method also involves ranking the predictions associated with sampling the formation based on at least one of a sample fluid quality, a sampling process duration, a sampling process efficiency or a cost of sampling, and planning the sampling operation based on the ranked predictions.

8 Claims, 15 Drawing Sheets

(56) References Cited

U.S. PATENT DOCUMENTS

| | | | |
|---|---|---|---|
| 6,109,368 | A | 8/2000 | Goldman et al. |
| 6,585,041 | B2 | 7/2003 | Crossley |
| 6,612,382 | B2 | 9/2003 | King |
| 7,114,562 | B2 | 10/2006 | Fisseler et al. |
| 7,546,228 | B2 * | 6/2009 | Cullick et al. .......... 703/10 |
| 7,937,223 | B2 | 5/2011 | Ciglenec et al. |
| 2002/0010548 | A1 | 1/2002 | Tare et al. |
| 2003/0225606 | A1 | 12/2003 | Raghuraman et al. |
| 2004/0220790 | A1 * | 11/2004 | Cullick et al. .......... 703/10 |
| 2005/0235745 | A1 | 10/2005 | Proett et al. |
| 2006/0184329 | A1 | 8/2006 | Rowan et al. |
| 2007/0079962 | A1 | 4/2007 | Zazovsky et al. |
| 2007/0192072 | A1 | 8/2007 | Cullick et al. |
| 2008/0162094 | A1 | 7/2008 | Geehan et al. |
| 2009/0299636 | A1 * | 12/2009 | Carnegie et al. .......... 702/6 |

OTHER PUBLICATIONS

Jianghui, et al., "Numerical Simulation of Mud-Filtrate Invasion in Deviated Wells", SPE 81919—SPE Reservoir Evaluation & Engineering, vol. 7 (2), Apr. 2004, pp. 143-154.

McCann, et al., "The Integrated Solution: New System Improves Efficiency of Drilling Planning and Monitoring", SPE 39332—IADC/SPE Drilling Conference, Dallas, Texas, Mar. 3-6, 1998, pp. 351-363.

Schlumberger, , "Eclipse Finite Difference Simulation", www.sib.com/sis, Apr. 2007, 2 pages.

Underhill, et al., "Model-Based Sticking Risk Assessment for Wireline Formation Testing Tools in the U.S. Gulf Coast". SPE 48963—SPE Annual Technical Conference and Exhibition, New Orleans, Louisiana, Sep. 27-30, 1998, pp. 79-89.

Yong, et al., "When Should We Worry About Supercharging in Formation-Pressure-While-Drilling Measurements?", SPE 92380—SPE Reseivoir Evaluation & Engineering, vol. 11 (1), Feb. 2008, pp. 165-174.

GB Examination Report dated Nov. 29, 2011 for corresponding GB Application No. GB1107694.0.

International Search Report dated May 4, 2010 for corresponding PCT application No. PCT/US2009/062303.

International Written Opinion dated May 4, 2010 for corresponding PCT application No. PCT/US2009/062303.

Examination Report for German Application No. 112009002653.2 dated Nov. 3, 2014.

Official Action for Mexican Application No. MX/a/2011/004520 dated Jun. 4, 2014.

Examination Report No. 1 for Australian Application No. 2009320119 dated Dec. 5, 2014.

* cited by examiner

METHODS AND APPARATUS FOR PLANNING AND DYNAMICALLY UPDATING SAMPLING OPERATIONS WHILE DRILLING IN A SUBTERRANEAN FORMATION

RELATED APPLICATION

The present disclosure claims the benefit of the filing date of U.S. Provisional Patent Application No. 61/110,857, filed on Nov. 3, 2008, which is hereby incorporated herein by reference in its entirety.

BACKGROUND

During sampling-while-drilling operations, the conditions under which a borehole is drilled impact the amount of drilling fluid filtrate that penetrates the formation, the amount of power available downhole to pump fluid from the formation and the time required to obtain a pristine formation fluid sample. In some examples, the drilling equipment of a drillstring may include a downhole tool to sample and/or test the fluids of the surrounding subterranean formations. The sampling may be accomplished using formation testing tools that retrieve the formation fluids at desired borehole positions or stations and/or test the sampled fluids at the downhole locations. However, to manage the process of acquiring a pristine formation fluid sample, a large number of variables must be considered. Known sampling-while-drilling techniques rely heavily on experience to adjust the sampling and drilling parameters to perform a relatively cost effective and efficient sampling operation. However, such empirical techniques are limited in scope and may decrease the efficiency and/or increase the overall cost of the sampling operation if the drilling and/or sampling parameters are not properly identified and/or are not adjusted appropriately.

Related prior art includes SPE 92380, which presents the use of a simulation engine in connection with pore pressure or reservoir pressure measurements. Another example may be found in U.S. Patent Application Publication No. 2005/0235745. Additionally, U.S. Patent Application Publication No. 2007/0079962 also describes a job planner for a guard probe. The foregoing references are hereby incorporate by reference in their entireties.

DETAILED DESCRIPTION

Figure 1:
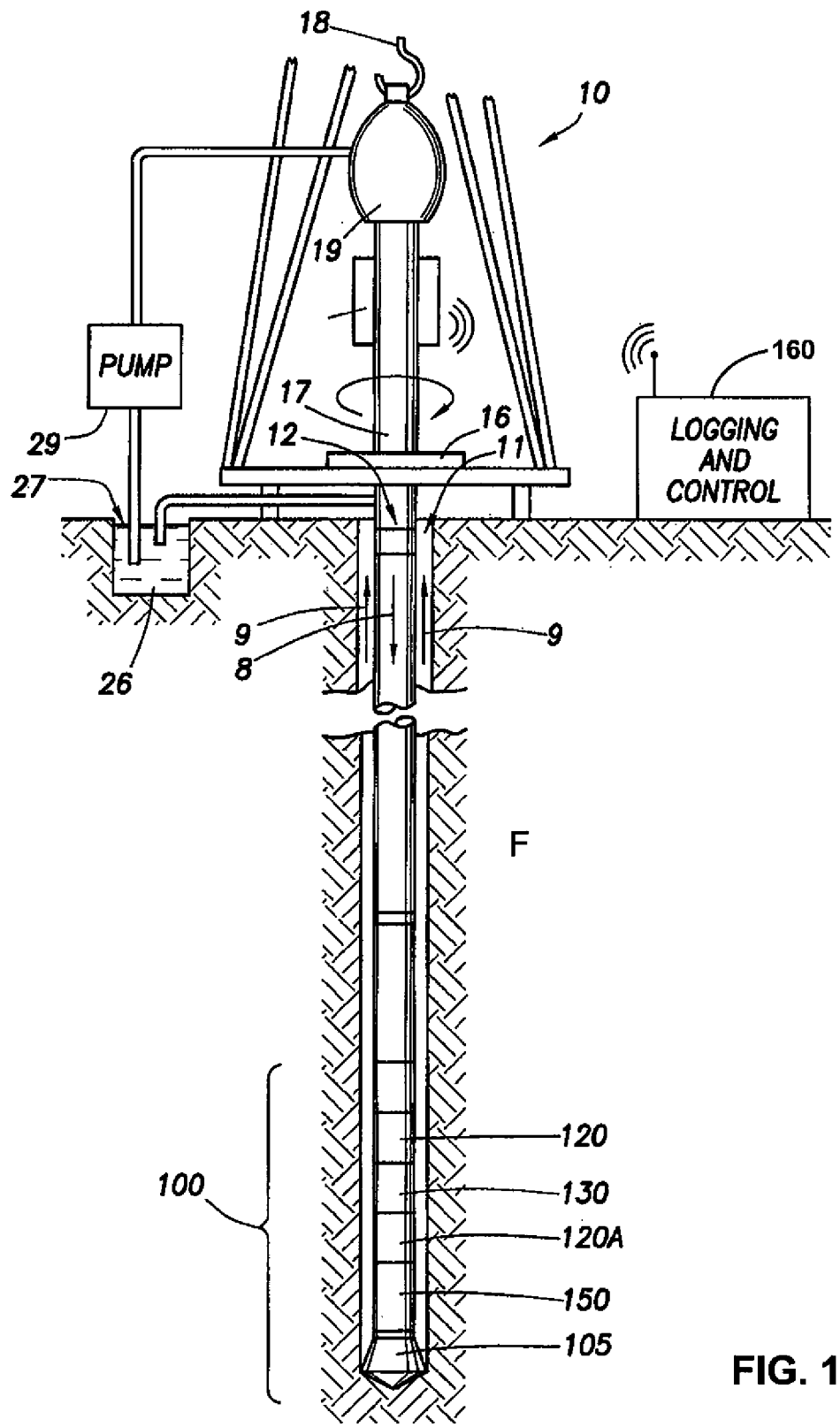
FIG. 1 is a schematic view of an example wellsite drilling system.

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

Certain examples are shown in the above-identified figures and described in detail below. In describing these examples, like or identical reference numbers may be used to identify the same or similar elements. Additionally, several examples have been described throughout this specification. Any features from any example may be included with or replaced with, or may otherwise be combined with, other features from other examples to form new examples.

In general, the example methods and apparatus described herein may be used to plan and dynamically optimize formation fluid sampling operations performed in conjunction with drilling a wellbore or borehole in a subterranean formation. As described in greater detail below, the example methods and apparatus, in contrast to many known formation fluid sampling techniques, enable integral planning of drilling and formation fluid sampling operations and iterative, dynamic updating of parameters associated with drilling and/or sampling operations to substantially increase the effectiveness and/or efficiency of a formation fluid sampling operation or job. More specifically, prior to drilling and sampling, the example methods and apparatus may select or determine an initial estimated or predicted best (e.g., most efficient or cost effective) drilling plan and sampling plan in a coordinated or integrated manner. In particular, the example methods and apparatus may use historical data relating to sets of drilling and sampling parameters and corresponding parameter values to identify one or more possible drilling and/or sampling scenarios, plans or processes. As described in more detail below, each of the plans, scenarios or processes may be analyzed using, for example, a simulation engine, which may include one or more simulators, to enable a relative comparison and/or ranking of the plans, scenarios or processes based on the estimated or predicted sampling results provided by each of the plans, scenarios or processes. In this manner, the example methods and apparatus enable selection of an initial drilling and/or sampling plan estimated or predicted to provide the best (e.g., the most accurate and cost-effective) sampling results.

The example methods and apparatus may further enable the selected initial drilling and/or sampling plan(s) to be updated dynamically during drilling and/or during sampling operations. More specifically, one or more drilling-related parameter values and/or one or more sampling-related parameter values may be gathered or measured during drilling or while drilling is temporarily halted. Those gathered or measured parameter values may then be used to update (e.g., modify) the initially selected drilling and/or sampling plan(s). Such updates may, for example, occur dynamically during a formation fluid sampling operation and/or may occur between drilling activities (i.e., while drilling is temporarily halted or stopped) during the course of a sampling job, which may entail sampling formation fluid at one or more locations along a borehole being drilled. Updating the drilling and/or sampling plan(s) may occur multiple times during the execution of a sampling job and such updating may involve updating one or more models (e.g., formation models, mudcake models, etc.), parameters, etc.

Thus, as noted above, the example methods and apparatus described herein advantageously enable an initial drilling and/or sampling plan to be generated so that drilling activities and sampling activities are planned together or in an integral manner. Additionally, once the drilling activities are initiated, the initial drilling and/or sampling plan(s) may be updated or modified during the execution of a sampling job during the drilling of a borehole. As a result, the example methods and apparatus enable a more effective, efficient, and cost-effective collection and analysis of one or more formation fluid samples during the drilling activities.

FIG. 1 illustrates an example wellsite drilling system that can be employed onshore and/or offshore, but which is shown in FIG. 1 as deployed onshore. The example system of FIG. 1 may be used in conjunction with the example sampling-while-drilling methods and apparatus described herein. However, it should be recognized that the example methods and apparatus described herein are more generally applicable and, thus, may also be used with any other wellsite drilling system(s).

In the example wellsite system of FIG. 1, a borehole 11 is formed in one or more subsurface formations by rotary and/or directional drilling. As illustrated in FIG. 1, a drillstring 12 is suspended in the borehole 11 and includes a bottomhole assembly (BHA) 100 having a drill bit 105 at its lower end. A surface system includes a platform and derrick assembly 10 positioned over the borehole 11. The derrick assembly 10 includes a rotary table 16, a kelly 17, a hook 18 and a rotary swivel 19. The drillstring 12 is rotated by the rotary table 16, energized by means not shown, which engages the kelly 17 at an upper end of the drillstring 12. The example drillstring 12 is suspended from the hook 18, which is attached to a traveling block (not shown), and through the kelly 17 and the rotary swivel 19, which permits rotation of the drillstring 12 relative to the hook 18. Additionally or alternatively, a top drive system could be used.

In the example depicted in FIG. 1, the surface system further includes drilling fluid 26, which is commonly referred to in the industry as mud, and which is stored in a pit 27 formed at the wellsite. A pump 29 delivers the drilling fluid 26 to the interior of the drillstring 12 via a port in the rotary swivel 19, causing the drilling fluid 26 to flow downwardly through the drillstring 12 as indicated by the directional arrow 8. The drilling fluid 26 exits the drillstring 12 via ports in the drill bit 105 and then circulates upwardly through the annular region between the outside of the drillstring 12 and the wall of the borehole 11 as indicated by the directional arrows 9. The drilling fluid 26 lubricates and cools the drill bit 105, carries formation cuttings up to the surface as it is returned to the pit 27 for recirculation, and creates a mudcake layer (e.g., filter cake) (not shown) on the walls of the borehole 11.

The example bottomhole assembly 100 of FIG. 1 includes, among other things, any number and/or type(s) of logging-while-drilling (LWD) modules or tools (two of which are designated by reference numerals 120 and 120A) and/or measurement-while-drilling (MWD) modules (one of which is designated by reference numeral 130), a rotary-steerable system or mud motor 150 and the example drill bit 105. The MWD module 130 measures the drill bit 105 azimuth and inclination that may be used to monitor the borehole trajectory.

The example LWD tools 120 and 120A of FIG. 1 are each housed in a special type of drill collar, as it is known in the art, and each contains any number of logging tools and/or fluid sampling devices. The example LWD tools 120 and 120A include capabilities for measuring, processing and/or storing information, as well as for communicating with the MWD module 130 and/or directly with the surface equipment, such as, for example, a logging and control computer 160.

The logging and control computer 160 may include a user interface that enables parameters to be input and/or outputs to be displayed that may be associated with measurements obtained by the examples described herein and/or predictions associated with sampling a formation F such as an extent of a zone invaded by the drilling fluid (e.g., drilling mud filtrate). The parameter inputs to the logging and control computer 160 may include seismic data (e.g., seismic surveys and/or seismic velocities), openhole logs including formation evaluation data, and/or rock mechanical properties (e.g., formation strength), each of which is associated with the formation F. Additionally or alternatively, the parameter inputs may include data related to drilling fluid rheology such as drilling fluid viscosity, drilling fluid density, drilling fluid yield stress, drilling fluid gel strength, drilling fluid composition and/or drilling fluid compressibility. Further, the parameter inputs may include borehole trajectory, borehole dimensions, drillstring geometry, pump parameters (e.g., pump rate), drilling parameters, sampling parameters and/or formation parameters. While the logging and control computer 160 is depicted in FIG. 1 as uphole and adjacent the wellsite system, a portion or the entire logging and control computer 160 may be positioned in the bottomhole assembly 100 and/or in a remote location.

Figure 2:
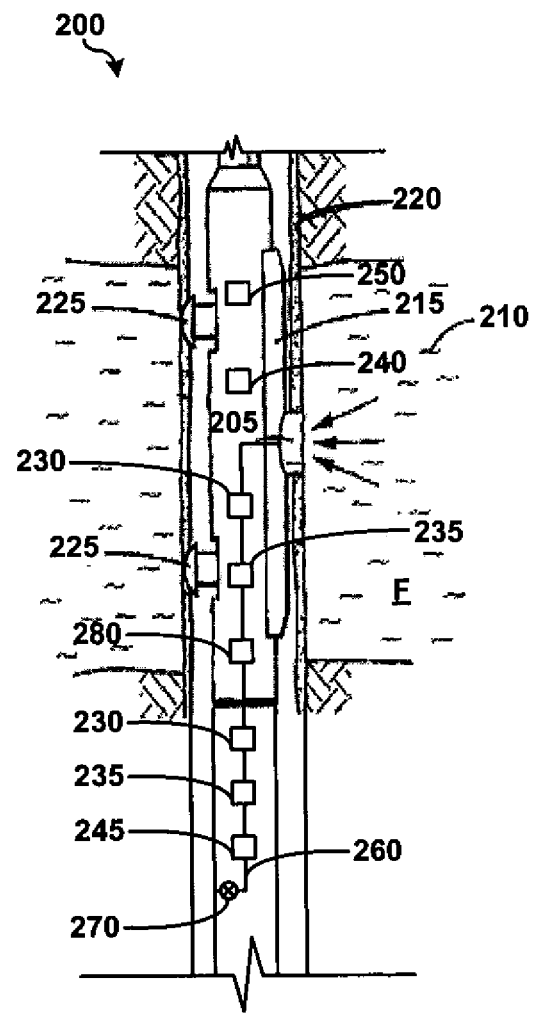
FIG. 2 is a schematic view showing an example manner of implementing either or both of the example logging while drilling (LWD) modules of FIG. 1.

FIG. 2 is a simplified diagram of a sampling-while-drilling logging device 200 (LWD tool 200) that may be used to implement the LWD tools 120 and/or 120A. In the illustrated example, the LWD tool 200 is of a type described in U.S. Pat. No. 7,114,562, which is assigned to the assignee of the present patent and incorporated herein by reference in its entirety. However, other types of LWD tools can be used to implement the LWD tool 200.

The example LWD tool 200 of FIG. 2 is provided with a probe 205 configured to establish fluid communication with the formation F and to draw formation fluid 210 into the LWD tool 200 as indicated by the arrows. The example probe 205 may be positioned, for example, within a stabilizer blade 215 of the LWD tool 200 and extend from the stabilizer blade 215 to engage a borehole wall 220. The example stabilizer blade 215 includes one or more blades that may be in contact with the borehole wall 220.

The formation fluid 210 drawn into the LWD tool 200 via the probe 205 may be measured to determine, for example, fluid composition, viscosity, density, optical density, absorbance, fluorescence, resistivity and/or conductance, dielectric constant, temperature, etc. The LWD tool 200 may also be provided with one or more fluid measurement units 230 and one or more sensors 235, which are collectively configured to measure parameters (e.g., process parameters, formation parameters, etc.). The fluid measurement unit(s) 230 may include, for example, a light absorption spectrometer having a plurality of channels, each of which may correspond to a different wavelength. Thus, the fluid measurement unit(s) 230 may be configured to measure spectral information for fluids drawn from the formation F. This spectral information may be utilized to determine a composition and/or other properties of the fluid. The fluid measurement unit(s) 230 may additionally or alternatively include a mass spectrometer and/or a chromatography unit, an NMR spectrometer, a fluorescence spectrometer, a resistivity measurement unit and/or any other suitable fluid measurement unit. The measurements obtained by the fluid measurement unit(s) 230 may be utilized by a simulation engine 240 to aid in (e.g., to update) the drilling process and/or the sampling process. For example, the simulation engine 240 may be used to predict the variation in formation fluid properties with depth, to predict the variation in fluid properties with time during the sampling process, and/or to generate logs to calibrate a drilling fluid invasion profile as described in greater detail below.

The sensors 235 may be configured to measure pressure (e.g., pressure at the probe 205 and annular pressure while drilling), temperature, drilling fluid flow rate (e.g., annular drilling fluid flow rate), drilling fluid density, borehole trajectory, formation fluid density, formation fluid viscosity, drillstring and/or drill component location(s) relative to a borehole, and/or cuttings production. Additionally or alternatively, the sensors 235 may be configured to measure, among other things, a rate of penetration of the drill bit 105, a volume of formation that has been drilled, a rotational speed of the bottomhole assembly 100, a mudcake mass, a mudcake compaction, an amount of movement of the bottomhole assembly 100, a drilling fluid loss, logging while drilling shallow measurements and/or a depth of the drillstring 12.

One or more of the parameters measured by the sensors 235 may be used by the simulation engine 240 to determine, predict and/or update a flow regime in the borehole, a drilling fluid filtration rate, a pore pressure model, formation mobility, a pressure distribution history, a drilling fluid circulation history, mudcake parameters and/or drilling fluid (e.g., filtrate) invasion. Additionally, some or all of these measured parameters may be used by the simulation engine 240 to determine, predict and/or update a mudcake model, a formation model (including a formation fluid model), a mudcake deposition model, a mudcake erosion model, a mudcake compressibility model, a mudcake permeability model, a mudcake desorption model, a sandface pressure and/or a formation porosity. Further, one or more of these measured parameters may be used by the simulation engine 240 to determine, predict and/or update a formation compressibility, a drilling fluid model, a model to estimate formation properties and/or drilling fluid properties, equations of fluid mechanics in the borehole, a spurt invasion model, a formation flow model and/or a sampling tool performance model. As noted above and described in more detail below, the foregoing parameters and/or models may be updated dynamically with data collected during a sampling job being executed during drilling of a wellbore or borehole to enable more effective and efficient formation fluid sampling and analysis.

The sensors 235 may output analog and/or digital signals, which may be digitized representations of analog signals, processed to reduce noise and/or to reduce the number of bits used to represent the output (i.e., compressed). The output(s) may additionally or alternatively include one or more parameters derived from measured data and/or one or more sensor outputs.

The LWD tool 200 may be provided with devices such as, for example, at least one pump 280 to withdraw a desired amount of fluid from the formation F at a specified rate. The LWD tool 200 may also include a chamber 245 for collecting fluid samples for retrieval at the surface, at least one flowline 260 fluidly coupled to the probe 205, the pump 280 and at least one controllable discharge port 270, which may be used to discharge fluid drawn from the formation F to the borehole (e.g., during a sample cleanup operation). Backup pistons 225 may also be provided to assist in applying force to push the LWD tool 200 and/or the probe 205 against the borehole wall 220. Additionally, to generate simulation outputs and/or predictions, the example LWD tool 200 of FIG. 2 includes the simulation engine 240 and a processing unit 250. However, the simulation engine 240 and/or the processing unit 250 may be located elsewhere within a tool or drillstring and/or may be located partially or completely at the surface.

Figure 3:
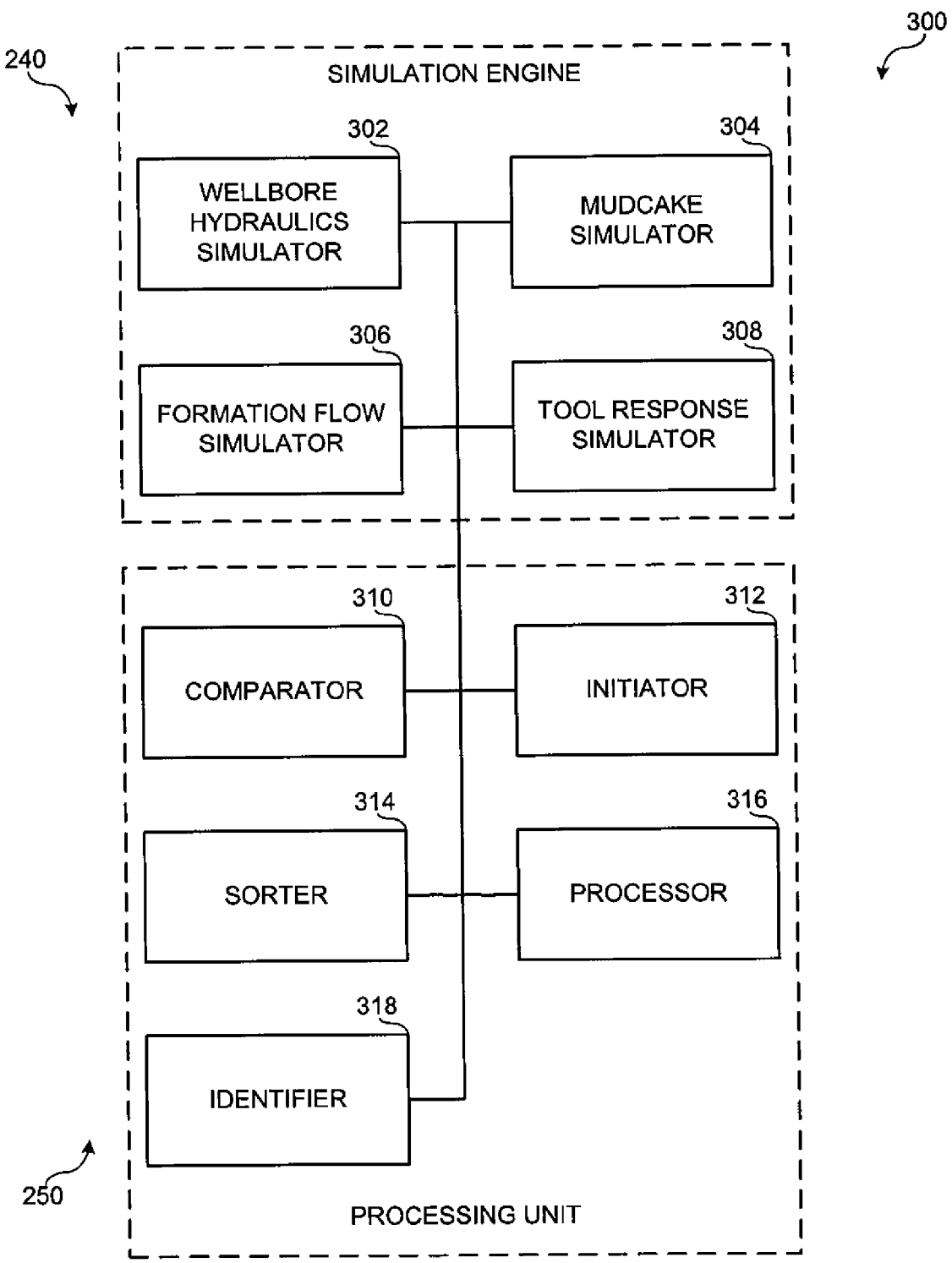
FIG. 3 is a block diagram of an apparatus according to one of more aspects of the present disclosure.

FIG. 3 is a block diagram of an example apparatus 300 that may be used to implement the simulation engine 240 and the processing unit 250 of FIG. 2. Referring to FIGS. 2 and 3 collectively, the example simulation engine 240 may include any number and/or type of simulators, and the processing unit 250 may include any number and/or type of processing modules. In the example of FIG. 3, the simulation engine 240 includes a wellbore hydraulics simulator 302, a mudcake simulator 304, a formation flow simulator 306 and a tool response simulator 308. The processing unit 250 includes a comparator 310, an initiator 312, a sorter 314, a processor 316 and/or an identifier 318. Fewer, additional and/or different simulators and modules may be used to implement the simulation engine 240 and the processing unit 250 to suit the needs of a particular application.

While the simulation engine 240 and the processing unit 250 are depicted as part of the LWD tool 200 in FIG. 2, the simulation engine 240 and/or the processing unit 250 may alternatively be implemented at least partially in the MWD module 130. Additionally or alternatively, the simulation engine 240 and/or the processing unit 250 may be implemented partially or wholly as part of the logging and control computer 160. For example, if communication between the BHA 100 (FIG. 1) and the surface is via a high speed communication channel (e.g., wired drill pipe), the data transmission rate may be sufficient to enable the simulation engine 240 and processing unit 250 to be located wholly within the logging and control computer 160.

While an example manner of implementing the simulation engine 240 and the processing unit 250 of FIG. 2 are illustrated in FIG. 3, one or more of the elements, processes and/or devices illustrated in FIG. 3 may be combined, divided, rearranged, omitted, eliminated and/or implemented in other ways. More generally, the example simulation engine 240 and/or the example processing unit 250 may be implemented by hardware, software, firmware and/or any combination of hardware, software and/or firmware. Thus, for example, any of the simulators 302-308 and/or the modules 310-318 may be implemented by one or more circuit(s), programmable processor(s), application specific integrated circuit(s) (ASIC(s)), programmable logic device(s) (PLD(s)) and/or field programmable logic device(s) (FPLD(s)), etc. Additionally, the example simulation engine 240 and the example processing unit 250 may include one or more elements, processes and/or devices in addition to, or instead of, those illustrated in FIG. 3.

In operation, the simulators 302-308 may automatically cooperate (e.g., interoperate or communicate to exchange parameter values and/or other data) to perform analyses that may be used to update (e.g., iteratively) drilling parameters and/or sampling parameters to improve the results of a sampling operation or job being performed in conjunction with drilling activities. However, it should be recognized that not all states of a given one of the simulators 302-308 will necessarily be compatible with possible states of one or more other ones of the simulators 302-308. In fact, in some cases, only one set of parameters may be valid when all of the simulators 302-308 are interoperating or cooperating to carry out an analysis or analyses needed to update drilling and/or sampling plans in accordance with the examples described herein.

To solve and/or determine equations of fluid mechanics in the borehole 11 (FIG. 1), the example simulation engine 240 is provided with the wellbore hydraulics simulator 302. A known wellbore hydraulics simulator is described in "Drilling Office" a Schlumberger® marketing reference, and in "The Integrated Solution: New System Improves Efficiency of Drilling Planning and Monitoring," SPE 39322, both of which describe a hydraulics module provided by Schlumberger' s® Drilling Office application product, and which are both hereby incorporated herein by reference in their entireties. The wellbore hydraulics simulator 302 is configured to receive and process inputs and generate outputs related to a flow regime (e.g., flow velocity distribution) and/or a pressure distribution history (e.g., annular pressure, an equivalent circulating density and/or an equivalent static density). In particular, the circulating mud flow regime may be indicated to be turbulent or laminar which, in turn, has implications for the predictions made by the mudcake simulator 304. Thus, the simulation results (or information associated with the simulation results) generated by the wellbore hydraulics simulator 302 may be provided to the mudcake simulator 304 to enable the mudcake simulator 304 to more accurately model the mudcake in the borehole. Additionally, the pressure distribution history may be translated into equivalent circulating density and/or equivalent static density.

Inputs to the wellbore hydraulics simulator 302 may be associated with drilling fluid rheology parameters, drilling parameters and/or reservoir data. Parameters related to the drilling fluid rheology may include drilling fluid viscosity, drilling fluid density, drilling fluid yield stress, drilling fluid gel strength and/or drilling fluid compressibility, among others. The parameters relating to the drilling fluid rheology may be determined uphole, for example, in a laboratory and/or at the wellsite and later entered into the logging and control computer 160 (FIG. 1). The parameters relating to drilling fluid rheology may depend on, for example, the pressure and/or the temperature in the borehole. An estimate of the pressure may be determined by the drilling fluid density and a measure of the vertical depth of the drillstring relative to the surface. The pressure may additionally or alternatively be determined from measurements obtained by one or more of the sensors 235 (FIG. 2).

Parameters related to drilling include drillstring geometry, borehole trajectory, drilling fluid circulation rate history, depth of the drillstring, cuttings production and/or rotational speed of the bottomhole assembly. The drillstring geometry may include the dimensions and/or diameter of different components of the bottomhole assembly, which may include the drill bit, the drill collars, the drill pipe and/or the centralizers or stabilizers, etc. The drillstring geometry and/or location may be utilized to determine drilling fluid flow areas along the borehole trajectory.

The borehole trajectory may be relatively vertical, angled and/or horizontal relative to the surface. The borehole trajectory may be used to determine the location of the bottomhole assembly in the borehole. The location of the bottomhole assembly in the borehole may be utilized to determine a shape of the drilling fluid flow area (e.g., annular or moon shaped) along the trajectory of the borehole. This information and a drilling fluid pump rate may be used to determine and/or predict a flow regime experienced by the drilling fluid. For example, if the borehole trajectory is relatively horizontal relative to the surface, the bottomhole assembly may be positioned on its side and, thus, the shape of the drilling fluid flow area may be substantially half-moon shaped. Alternatively, if the borehole trajectory is relatively vertical relative to the surface, the bottomhole assembly may be positioned in the center of the borehole and, thus, the shape of the drilling fluid flow area may be substantially annular. Additionally, the effects of gravity on the bottomhole assembly may be taken into account by the wellbore hydraulics simulator 302.

The drilling fluid circulation rate is associated with a drilling fluid pumping rate, which is used, among other uses, to determine an average flow of drilling fluid across a cross-section of the borehole. Delays and/or interruptions to the drilling fluid circulation caused by, for example, connecting additional drill pipe sections may also be considered.

The depth of the drillstring (e.g., driller's depth) is related to the length of the drillstring in the borehole. The depth of the drillstring may be utilized to generate models associated with the effects of pressure surges and/or swabbing (e.g., moving the drillstring and/or other components of the bottomhole assembly along the borehole 11 (FIG. 1) may result in a reduction in the well pressure which, in turn, may initiate a flow of hydrocarbons from the formation F). Additionally or alternatively, the depth of the drillstring may be used to generate models associated with the effect of a passage of time between when the formation F (e.g., the rock) was first drilled by the drill bit 105 (FIG. 1) and the time at which sampling is to occur.

Cuttings production is associated with the small pieces of rock that break away from the formation F as the drill bit 105 destroys the formation F rock in front of the drill bit 105. The amount of cuttings production is dependent on the volume of the formation that is drilled via the drill bit 105 and the type of drill bit that is used. The cuttings production impacts the borehole pressure and the effective circulating density, which is the apparent density of the circulating drilling fluid derived from a measurement of the pressure exerted by the drilling fluid at that depth. The effective circulating density considers a pressure drop in the annulus above the point in the formation F being considered.

The drillstring rotational speed relates to the revolutions per minute of the drillstring relative to the borehole. The drillstring rotational speed impacts the flow regime experienced by the drilling fluid (e.g., whether it is laminar or turbulent). Additionally, the drillstring rotational speed impacts mudcake mechanics and the drilling fluid invasion rate, that is, the rate at which the drilling fluid, primarily filtrate, penetrates the formation F.

Parameters related to the reservoir data that may also be used by the wellbore hydraulics simulator 302 include the temperature of the well fluid and, if available, the temperature of the formation F. However, in other examples, any other number of parameters relating to reservoir data may be used by the wellbore hydraulics simulator 302 instead of or in addition to those mentioned above.

To determine and/or predict a filtration rate or a drilling fluid (e.g., filtrate) volume at the borehole wall 220 along the borehole trajectory, the example simulation engine 240 is provided with the mudcake simulator 304. The mudcake simulator 304 may be implemented using a known mudcake simulator such as the simulator described in "When Should We Worry About Supercharging in Formation Pressure While Drilling Measurements?", SPE/IADC 92380, which is hereby incorporated herein by reference in its entirety. However, any other mudcake simulator could be used instead. Generally, the mudcake simulator 304 receives and processes inputs to generate outputs related to a filtration rate or a drilling fluid volume injected at the borehole wall 220 along the borehole trajectory. Additionally, the mudcake simulator 304 includes internal variables that are associated with a mudcake mass and/or mudcake compaction. The mudcake mass is associated with a mass of solid material that is deposited on the borehole wall 220. Generally, properties of the mudcake such as, for example, thickness, porosity, permeability, compressibility, strength, filtration rate and/or "stickance," may be monitored (e.g., as set forth in "Model-Based Sticking Risk Assessment for Wireline Formation Testing Tools in the U.S. Gulf Coast," Underhill, W B, L. Moore, and G. H. Meeten, SPE 48963, which is hereby incorporated by reference in its entirety) to indicate when properties should be adjusted to substantially ensure that the drillstring and/or the bottomhole assembly do not become stuck (e.g., lost) in the borehole.

The inputs used by the mudcake simulator 304 may be associated with mudcake parameters, parameters related to reservoir data and/or wellbore hydraulics parameters, which may be provided by or generated based on information or data provided by the wellbore hydraulics simulator 302. Specifically, parameters related to the mudcake include parameters for use with a mudcake deposition model, a mudcake erosion model, a mudcake permeability model and/or a mudcake desorption model. The mudcake deposition model represents an amount of mudcake that is deposited on the borehole wall 220 as a function of the amount of drilling fluid filtrate that invades (e.g., seeps into) the formation F. The mudcake deposition model may take into account dynamic filtration, which may be associated with material that is simultaneously eroding and depositing on the mudcake as drilling fluid circulates over the mudcake. In particular, dynamic filtration is associated with a growth limit of the mudcake when the filtration rate is too small relative to shear stress exerted on the mudcake by the flow of drilling fluid, which prevents further accretion of solid particles on the mudcake.

The mudcake erosion model represents a rate at which the mudcake erodes as a result of the flow of the drilling fluid in the borehole. For example, the mudcake may erode constantly and rapidly if the flow of the drilling fluid in the borehole is turbulent.

The mudcake permeability model and/or the mudcake desorption model represent the permeability of the mudcake as a function of the mass of particles accreted to the mudcake. Additionally, the mudcake permeability model and/or the mudcake desorption model represent the manner in which mudcake porosity varies with mudcake thickness.

Parameters related to the reservoir data that may be used by the mudcake simulator 304 include sandface pressure and a spurt invasion model. Sandface pressure represents the pressure at the interface between the formation F and the (external) mudcake deposited on the borehole wall 220. The sandface pressure may be approximated by the formation pressure. For planning purposes, a seismic survey of the formation F and/or the reservoir may be used to determine the pressure of the formation F or the pressure information may be determined based on pressure measurements made in offset wells. However, in other examples, the formation pressure may be determined from measurements obtained by the sensors 235 (FIG. 2). Alternatively, as described below, the sandface pressure may be estimated and/or determined by using the mudcake simulator 304 together with the formation flow simulator 306.

The spurt invasion model, which may be an approximation, represents the filtration of drilling fluid before mudcake has formed on the borehole wall 220. In particular, the spurt invasion model represents the ability of the drilling fluid to displace and/or replace connate formation fluid (e.g., water, oil and/or gas in pore spaces in the formation rock) after the drill bit exposes fresh formation surfaces during drilling. Generally, the spurt invasion model depends, at least in part, on the permeability of the formation, the rheological properties of the drilling mud and the pressure differential between the circulating wellbore fluid and the formation.

As described above, the wellbore hydraulics parameters may include those parameters used in the determination of a flow regime (e.g., flow velocity) and/or a pressure distribution history (e.g., annular pressure, an equivalent circulating density and/or an equivalent static density). The flow regime may indicate that the flow is turbulent or laminar. The wellbore hydraulics parameters used by the mudcake simulator 304 may be obtained from the outputs of the wellbore hydraulics simulator 302.

To determine and/or estimate, in part, mudcake parameters and/or reservoir data, the example simulation engine 240 is provided with the formation flow simulator 306. A known formation flow simulator 306 is described in "ECLIPSE Finite Difference Simulation," a Schlumberger® marketing reference, and in "Numerical Simulation of Mud-Filtrate Invasion in Deviated Wells," SPE 87919, both of which are hereby incorporated herein by reference in their entireties. When applied to the sampling process, the formation flow simulator 306 receives and processes inputs to generate outputs related to a drilling fluid filtrate saturation profile around the borehole, a sampled fluid composition, and a formation response to sampling and/or the sandface pressure. The determined and/or computed sandface pressure may be provided to the mudcake simulator 304 to update and/or refine the drilling fluid filtration rate. In turn, the determined and/or computed drilling fluid filtration rate may be utilized to update and/or refine the sandface pressure. While the example simulation engine 240 of FIG. 3 includes the formation flow simulator 306, in other examples, the simulation engine 240 may not include the formation flow simulator 306. In such examples, an impact of filtration on sampling may be determined from previous sampling and/or drilling experience with the formation F and from data relating to the drilling fluid filtration rate.

The inputs utilized by the formation flow simulator 306 may be associated with drilling fluid parameters, parameters related to reservoir data, sampling parameters and/or parameters related to a sampling tool model or tool model. As discussed in more detail below, one or more of the parameters related to the sampling tool model may be obtained or derived from the outputs of the tool response simulator 308, which thereafter may be utilized to control a sampling operation.

Parameters related to the drilling fluid may include drilling fluid filtration rate, drilling fluid filtrate density, drilling fluid filtrate viscosity, drilling fluid filtrate relative permeability and/or drilling fluid filtrate compressibility. The filtration rate may be determined by and/or computed by the mudcake simulator 304.

Parameters related to the reservoir data that may be used by the formation flow simulator 306 include formation pressure, formation porosity, formation fluid composition (and therefore component densities and concentrations/saturations), formation fluid phase behavior, formation fluid viscosities, formation fluid compressibility, formation compressibility, capillary pressure relationships and/or formation fluid relative permeabilities.

The formation porosity may be determined and/or estimated from openhole logs, core samples, offset well data and/or seismic surveys. Additionally, the formation compressibility may be determined and/or estimated from openhole logs, core samples, seismic velocities and/or local knowledge of the formation F. Further, the formation pressure may be determined and/or estimated from pore pressure correlations, openhole logs, seismic surveys and/or local knowledge of the formation F (e.g., offset well data).

The formation fluid properties may be determined from offset wells. The formation fluid properties may be adjusted based on the measurements obtained by the fluid measurement unit 230 and/or the sensors 235 of FIG. 2. Alternatively, the formation fluid properties and/or the formation properties may be adjusted so that the drilling fluid saturation profile generated and/or predicted from openhole log measurements (e.g., shallow resistivity measurements) matches and/or are similar to the drilling fluid saturation profile generated and/or predicted by the formation flow simulator 306. In operation, the formation flow simulator 306 may be utilized to update, estimate and/or refine mudcake parameters and/or parameters relating to reservoir data.

As discussed in "Invasion Revisited," of the July 1991 issue of Oil Review, pp. 10-20, which is hereby incorporated herein by reference in its entirety, a water-based drilling fluid invasion profile may be inferred from shallow resistivity measurements. When an oil-based drilling fluid invades an oil-bearing formation (such as the formation F of FIG. 1), resistivity measurements may not be effective to determine the while-drilling invasion profile. Under these circumstances other measurements sensitive to the contrast in properties between the invading fluid and the formation fluids may be performed. In particular, these measurements may be NMR measurements obtained using the ProVision tool and/or nuclear capture cross-section measurements made, for example, by the EcoScope tool, both of which are provided by Schlumberger®.

In the case where the formation flow simulator 306 is to model the flow into the sampling tool, the formation flow simulator 306 may include some parameters relating to a sampling tool. For example, the formation flow simulator 306 may include data associated with the sampling tool probe geometry (e.g., the diameter of the probe 205 of FIG. 2) the volume of the flowline (e.g., the flowline 260 of FIG. 2) and other tool components such as, for example, the geometry and dimensions of a sealing pad around the probe 205 and/or the geometry of the stabilizer 215.

The formation flow simulator 306 may be utilized to determine a flow of fluid drawn into a sampling tool (e.g., the LWD tool 200 of FIG. 2), a pumped volume of fluid and/or information associated with composition and/or contamination of the pumped volume of fluid.

To determine and/or identify the performance and/or operating point of the sampling tool (e.g., the LWD tool 200 of FIG. 2), the example simulation engine 240 may be provided with a tool response simulator 308. Generally, the tool response simulator 308 receives and processes inputs to generate outputs related to a tool operating point, an actual pressure drop and/or an actual flow rate. The inputs may be associated with a drilling fluid circulation rate, a drilling fluid type and/or a temperature in the borehole. Additionally or alternatively, the inputs may be associated with a formation response model, energy conversion efficiency and/or sampling tool operating limits. The sampling tool operating limits may include a maximum operating temperature, a limit on the maximum available power, a maximum pressure drop, a minimum flow rate and/or a maximum flow rate. Further, the inputs may be associated with a fluid response model, which may be obtained from the outputs of the formation flow simulator 306.

The formation flow simulator 306 and the tool response simulator 308 may be used to optimize pumping conditions. For example, some bottomhole assemblies (e.g., the bottomhole assembly 100 of FIG. 1) may be provided with a turbine (not shown) that drives an alternator (not shown). In operation, the turbine is exposed to the flow of the drilling fluid, which circulates in the borehole, to generate power and, thus, the greater the flow rate, the more energy and/or power there is available to components in the bottomhole assembly 100 (FIG. 1) and/or the LWD tool 200 (FIG. 2), etc. Additionally, as the flow rate of the drilling fluid increases, a higher volume of fluid may be extracted during a given time period and, thus, typically less time is necessary to obtain a sufficiently clean sample (e.g., a pristine formation fluid sample) for testing. However, while there are these advantages to increasing the flow rate of the drilling fluid, as the flow rate of the drilling fluid increases the amount of mudcake erosion also increases. Additionally, as the flow rate increases, the amount of drilling fluid invasion into the formation F also increases, which may be exacerbated if the flow regime in the borehole becomes turbulent.

In operation, outputs from the wellbore hydraulics simulator 302, the mudcake simulator 304 and/or the formation flow simulator 306 may be utilized by the tool response simulator 308 and, in turn, outputs from the tool response simulator 308 may be used by the wellbore hydraulics simulator 302, the mudcake simulator 304 and/or the formation flow simulator 306. The interaction between the formation flow simulator 306 and the wellbore hydraulics simulator 302, the mudcake simulator 304 and/or the tool response simulator 308 may enable the examples described herein to control pumping conditions to optimize the amount of energy produced via the turbine and decrease the amount of time necessary to obtain a sufficiently clean sample while maintaining adequate mudcake on the borehole wall and limiting the amount of drilling fluid invasion into the formation F.

Turning now to the processing unit 250, to compare, for example, outputs (e.g., a theoretical response) generated by the simulation engine 240 to actual measurements obtained from the fluid measurement unit 230 and/or the sensors 235, the example processing unit 250 is provided with the comparator 310. The comparator 310 may compare the outputs generated by the simulation engine 240 to actual measurements to determine if a sampling target (e.g., a particular location in a borehole) has been reached. Additionally or alternatively, the comparator 310 may compare predictions associated with the different processes, plans and/or scenarios to identify processes that reduce the cost of sampling, increase sample fluid quality and/or reduce the sampling process duration.

To initiate a sampling and/or a drilling operation, the example processing unit 250 is provided with the initiator 312. The initiator 312 initiates a drilling operation based on ranked predictions associated with different drilling and/or sampling activities, processes, plans or scenarios. Additionally or alternatively, the initiator 312 initiates a sampling operation based on the ranked predictions associated with the different activities, processes, plans or scenarios.

To sort and/or rank the outputs of the simulation engine 240, the example processing unit 250 is provided with the sorter 314. The sorter 314 sorts and/or ranks the predictions associated with different processes. In particular, the sorter 314 may sort and/or rank the processes according to the sample fluid quality, the duration of the sampling process, the cost associated with the sampling process and/or the amount of risk associated with obtaining the fluid sample. Additionally or alternatively, the sorter 314 may enable the identification of the parameter(s) (e.g., the sampling parameters(s)), which have the greatest impact on the sample fluid quality.

To identify different processes and/or parameters associated with the drilling and/or sampling operations, the example processing unit 250 is provided with the identifier 318. The different processes may be related to drilling and/or a point at which sampling is to occur in the borehole. Additionally or alternatively, the identifier 318 may identify mudcake parameters and/or parameters associated with a leaking mudcake, reservoir parameters, tool operating parameters and/or data related to the wellbore hydraulics model, some or all of which are based on a measured formation response to a sampling and/or drilling operation.

Figure 4:
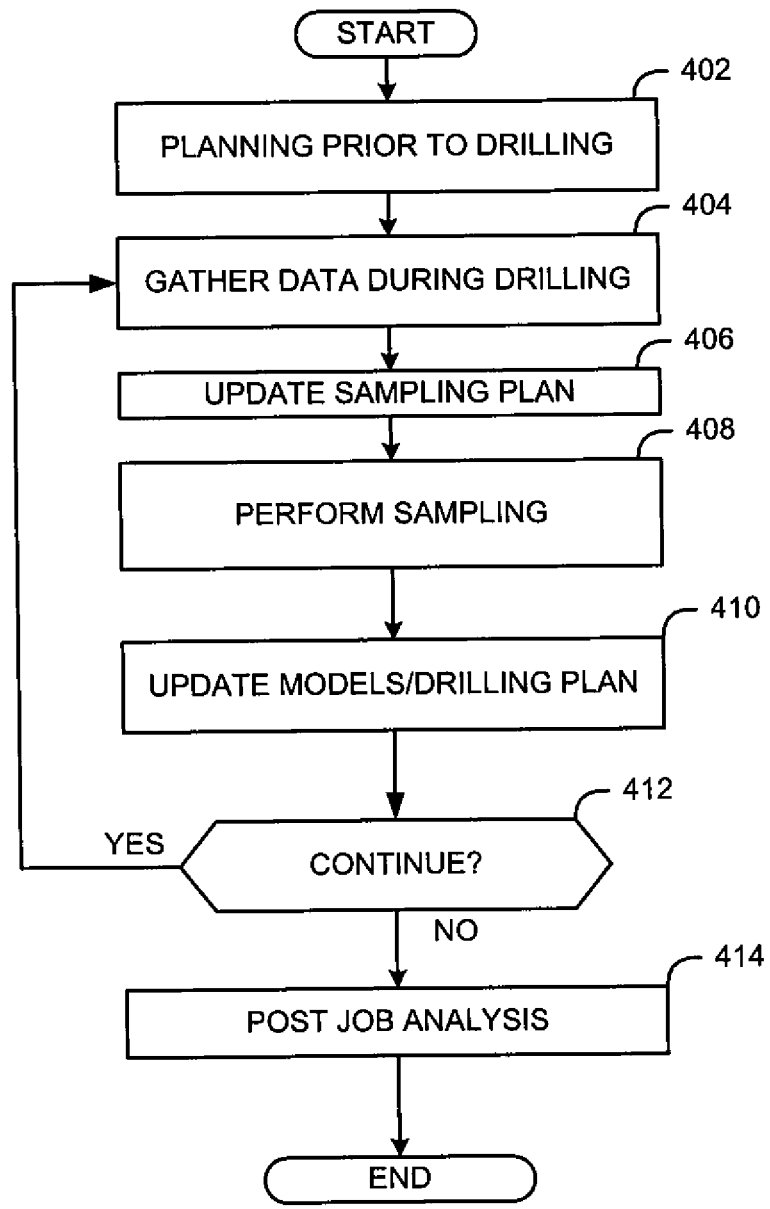
FIG. 4 is a flow diagram of an example method according to one of more aspects of the present disclosure.
Figure 5:
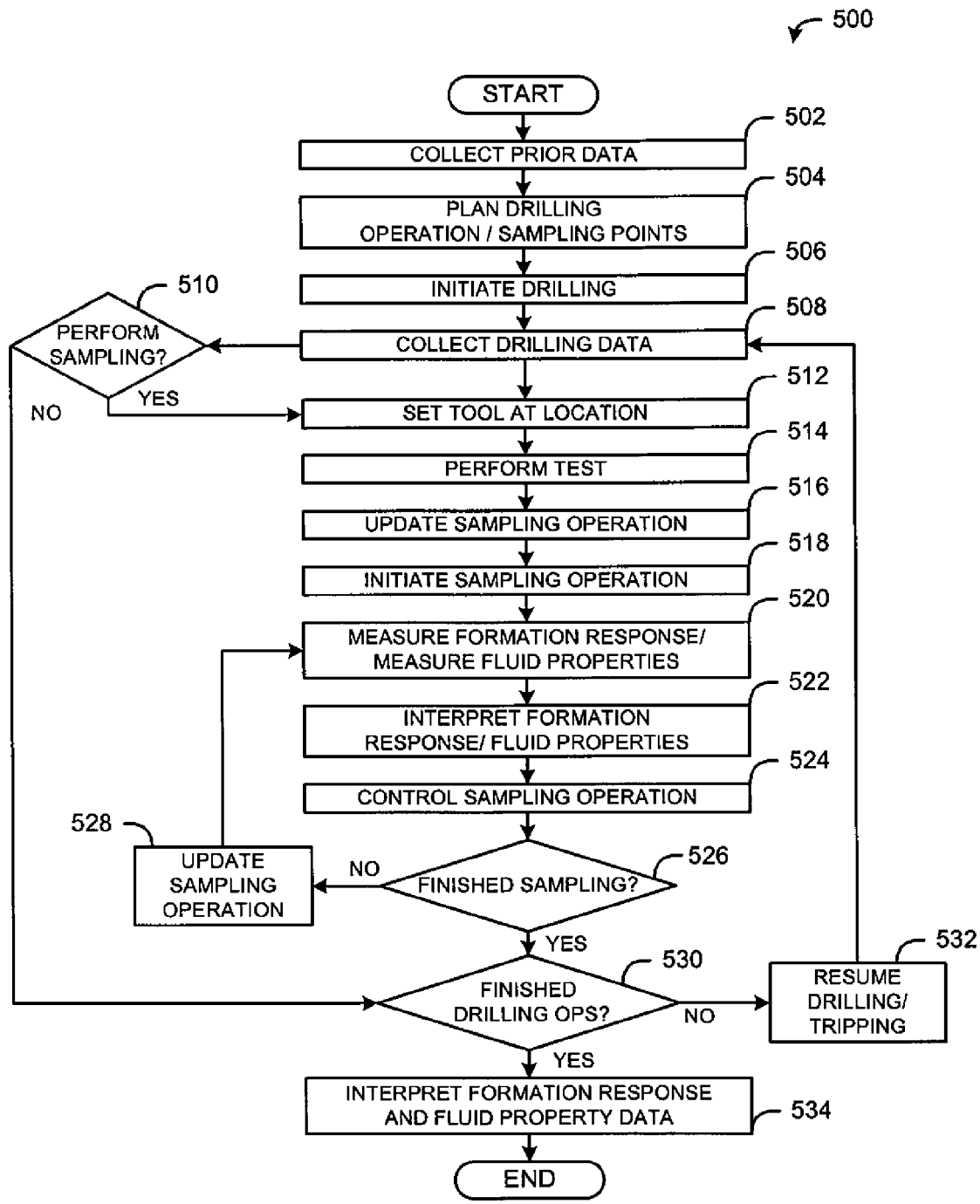
FIG. 5 is a more detailed flow diagram of another example method according to one of more aspects of the present disclosure.

FIGS. 4 and 5 are flowcharts of example methods that can be used for integrally planning and dynamically updating drilling and/or sampling operations in a subterranean formation (e.g., the formation F of FIG. 1). In particular, the example methods may be utilized to optimize planning operations, drilling and/or formation fluid sampling operations to improve an efficiency of a sampling operation or job, to reduce costs associated with the sampling operation or job, and/or to increase a quality of the sample formation fluid obtained. The example methods of FIGS. 4 and 5 may be used in conjunction with the example bottomhole assembly 100, the fluid measurement unit 230, the sensors 235, the simulation engine 240 and/or the processing unit 250 of FIG. 2. Additionally, the example methods of FIGS. 4 and 5 may be used to implement the wellbore hydraulics simulator 302, the mudcake simulator 304, the formation flow simulator 306, the tool response simulator 308, the comparator 310, the initiator 312, the sorter 314, the processor 316 and/or the identifier 318 of FIG. 3.

More generally, the example methods of FIGS. 4 and 5 may be implemented using software and/or hardware. In some example implementations, the flowcharts can be representative of example machine readable instructions and, thus, the example methods of the flowcharts may be implemented entirely or in part by executing the machine readable instructions. Such machine readable instructions may be executed by one or more of the logging and control computer 160 (FIG. 1), the processing unit 250 (FIG. 2) and/or the processor 316 (FIG. 3). In particular, a processor or any other suitable device to execute machine readable instructions may retrieve such instructions from a memory device (e.g., a random access memory (RAM), a read only memory (ROM), etc.) and execute those instructions. In some example implementations, one or more of the operations depicted in the flowcharts of FIGS. 4 and 5 may be implemented manually. Although the example methods are described with reference to the flowcharts of FIGS. 4 and 5, persons of ordinary skill in the art will readily appreciate that other methods to implement the bottomhole assembly 100, the fluid measurement unit 230, the sensors 235, the simulation engine 240 and the processing unit 250 of FIG. 2 and the wellbore hydraulics simulator 302, the mudcake simulator 304, the formation flow simulator 306, the tool response simulator 308, the comparator 310, the initiator 312, the sorter 314, the processor 316 and the identifier 318 of FIG. 3 to optimize planning operations, drilling operations and/or sampling operations may additionally or alternatively be used. For example, the order of execution of the blocks depicted in the flowcharts of FIGS. 4 and 5 may be changed and/or some of the blocks described may be rearranged, eliminated, or combined.

FIG. 4 is a flow diagram generally depicting an example process 400 for planning sampling and related drilling activities to improve the efficiency and/or effectiveness of a formation fluid sampling operation or job. The example process 400 is provided to facilitate an understanding of an overall or general process that may be used to improve the efficiency and/or effectiveness of a formation fluid sampling operation and a more detailed example is provided in connection with FIG. 5 below.

Turning to FIG. 4, the example process 400 begins with planning prior to drilling (block 402). Generally, the planning operations performed at block 402 involve selecting an initial set of drilling parameters and sampling parameters in a coordinated or integrated manner (i.e., together) to provide an estimated or predicted best starting point for subsequent drilling and/or sampling operations. Such a coordinated or integrated selection of initial parameters may enable more rapid and effective optimization of subsequent drilling and/or sampling parameters and operations, thereby enabling more rapid and/or effective optimization of sampling results. As a result, the example process 400 may be advantageously employed to provide significantly more accurate formation fluid sampling results in a more cost effective manner than many known formation fluid sampling techniques.

Also, as described in more detail below, the planning operations performed at block 402 may involve retrieving historical data relating to drilling and/or sampling operations and using that historical data to evaluate a plurality of possible drilling and/or sampling scenarios, plans or processes. The historical data typically includes parameter values for a plurality of parameters related to drilling and/or sampling operations corresponding to the possible drilling and/or sampling scenarios or plans. Thus, each of the drilling and/or sampling scenarios or plans may include one or more sets of possible drilling and sampling parameters and related historical parameter values, which may have been obtained, for example, during prior drilling and/or sampling activities.

The sets of possible drilling and sampling parameters corresponding to the possible drilling and/or sampling scenarios, plans or processes may include, for example, sampling tool parameters such as sampling tool type, a conveyance type (e.g., wireline, drillstring), drillstring configuration(s) and/or geometries, BHA dimensions, etc. The drilling and sampling parameters may alternatively or additionally include borehole parameters such as borehole trajectory, borehole dimensions, sampling points or depths, drilling fluid parameters such as drilling fluid flow rate(s), drilling fluid type(s) or compositions and/or properties or rheology such as viscosity, density, yield strength, gel strength, compressibility, filtration characteristics, mudcake parameters, etc. Still further, the drilling and sampling parameters may alternatively or additionally include sampling parameters such as sample collection time (e.g., a particular time and/or whether sampling occurs while drilling is temporarily suspended or while tripping the BHA) and duration, etc., reservoir or formation parameters including seismic data, permeability and other mechanical properties of the formation, formation fluid parameters, or any other parameters that may affect the quality, effectiveness and/or efficiency of drilling and/or a sampling operation.

As noted above, each of the possible drilling and/or sampling scenarios, plans or processes includes a set or combination of parameters and associated historical or stored values for each of the parameters. As described in greater detail below in connection with FIG. 5, the planning operations performed at block 402 provide these scenarios and their related parameters and parameter values to the simulation engine 240 and, in turn, to one or more of the simulators 302-308 to estimate or predict the efficiency and/or cost(s) associated with each of the scenarios or plans. The estimated efficiencies and/or costs can then be used to rank and/or select an initial drilling and/or sampling scenario, plan or processes and, thus, to select initial drilling and/or sampling parameters to provide a best starting point for the drilling and/or sampling operations to follow.

After completing the planning at block 402 and initiating drilling operations, the example process 400 gathers data during the drilling (block 404). Such gathered data may include parameters measured by, for example, LWD or MWD tools. In particular, drilling fluid parameters, borehole temperatures and pressures, borehole geometries, trajectory, etc., formation properties, formation fluid properties (e.g., collected during one or more sampling operations (e.g., during one or more preliminary tests) while the drilling is temporarily stopped), etc. may be measured and gathered for a pre-determined period of time or, alternatively, until a predetermined condition or set of conditions is/are satisfied (e.g., a particular depth has been reached, one or more measured parameter values are within a certain target range of values, above or below a threshold value, etc.). As used herein the term "preliminary test" refers to a fluid sampling test that may provide information related to formation mobility, formation pressure, and/or one or more formation fluid properties.

In any event, once the example process 400 has completed gathering data at block 404, the example process 400 updates the sampling plan (block 406) based on the data gathered at block 404. Such updating of the sampling plan enables the models and related parameters selected during the planning at block 402 to be updated with actual data relating to the borehole and formation currently being drilled and sampled. As a result, any subsequent sampling operation(s) may be performed more effectively and/or efficiently.

After the sampling plan has been updated at block 406, the example process 400 performs sampling in accordance with the updated sampling plan (block 408). As described in greater detail below in connection with FIG. 5, the sampling operation(s) performed at block 408 may be iteratively changed, modified or updated dynamically to further refine the sampling operation. In other words, the sampling operation(s) performed at block 408 may be managed or updated in real time to further refine the performance of the sampling operations(s). Such real time updating may involve measuring and analyzing formation response or properties and/or formation fluid properties, adjusting one or more drilling parameters (e.g., drilling fluid flow rate), adjusting a sample fluid flow rate, updating model parameters based on the analysis and then repeating or continuing the sampling operation. One or more sampling operation updates or cycles may be performed until the example process 400 determines that sampling at that particular borehole location or depth is complete.

After completing the sampling operation(s) at block 408 (e.g., at a particular borehole location or depth), one or more models and/or subsequent drilling plans may be updated. Such updates may be based on one or more analyses of the sampling operation(s) results obtained via block 408 and may involve updating and/or adjusting a comprehensive range of drilling-related parameters to further optimize any subsequent drilling and/or sampling operations.

The example process 400 then determines whether any further drilling and/or sampling is to be performed (block 412) and, if so, control returns to block 404 at which data is gathered during further drilling. Otherwise, the example process 400 may perform a post job analysis (block 414) using, for example, a job simulator (not shown). Such post job analysis may involve analysis and/or interpretation of formation response and fluid property data.

The example process 400 of FIG. 4 generally represents a process to dynamically plan drilling and related sampling operations to more effectively and efficiently collect and analyze formation fluid samples. However, it should be recognized that the general process 400 depicted in FIG. 4 may be implemented in many different particular manners to achieve similar results for a variety of different applications. Further, while a particular order of operations is depicted in FIG. 4, the various particular implementations of the example process 400 may re-order and/or eliminate one or more of the blocks shown in FIG. 4 and/or one or more additional blocks and associated operations may be included. For example, the post job analysis block 414 may not be performed in all implementations of the example process 400.

FIG. 5 is a flow diagram depicting one particular implementation of the general process 400 depicted in FIG. 4. An example process 500 depicted in FIG. 5 begins by collecting historical data relating to prior drilling and/or sampling operations (block 502). Such data may, for example, be collected from one or more databases, which may be located in or at least accessible by the logging and control computer 160 (FIG. 1). After collecting the historical or prior data at block 502, the example process 500 automatically plans drilling activities or operations and sampling activities or operations (block 504). Collectively, blocks 502 and 504 compose planning prior to drilling and, thus, correspond generally to block 402 of FIG. 4.

In any event, at block 504, the example process 500 may use the identifier 318 (FIG. 3) to identify two or more possible scenarios, plans or processes for drilling and/or sampling operations. Specifically, each of these scenarios, plans or processes may be composed of possible combinations of corresponding or related drilling parameters and/or sampling parameters and corresponding parameter values, which may be provided in whole or in part from the data collected at block 502.

The related parameters may include process parameters, drilling parameters, mudcake parameters, sampling parameters, reservoir parameters, sampling tool parameters, and/or drilling fluid parameters, some or all of which may be obtained prior to initiating a drilling operation and/or a sampling operation. Some drilling parameters include a borehole trajectory, borehole dimensions, BHA dimensions, a drilling fluid property, a drilling fluid flow rate history, the bottomhole assembly configuration, duration of a sampling operation and/or a time at which a sample is to be acquired from the formation F. The reservoir parameters may include seismic data relating to the formation F, sonic data relating to the formation F, openhole log data relating to the formation F, fluid properties, permeability, capillary pressures and their associated data relating to the formation F and/or rock mechanical properties (e.g., formation strength).

Drilling fluid parameters may include data obtained from laboratory measurements and/or performance results of particular drilling fluid(s) in the same or similar formations and/or under similar conditions. The drilling fluid parameters may include drilling fluid composition, drilling fluid rheology, which includes drilling fluid viscosity, drilling fluid density, drilling fluid yield strength, drilling fluid gel strength, drilling fluid compressibility and/or drilling fluid filtration characteristics.

Each of the scenarios, plans or processes and corresponding or related parameters may then be analyzed, evaluated or processed using one or more of the simulators 302-308. For example, the efficiency of the scenarios, plans or processes may be determined using one or more of the simulators 302-308. Such efficiencies may be determined for scenarios, plans or processes involving different positions of a sampling tool (e.g., the LWD tool 200 of FIG. 2) relative to a drill bit (e.g., the drill bit 105 of FIG. 1). Specifically, for example, the position of a sampling tool relative to a drill bit may be associated with sampling parameters that may be utilized by the formation flow simulator 306 and/or the mudcake simulator 304 to generate outputs which, in turn, may be used to determine and/or estimate mudcake parameters and/or reservoir data.

Efficiencies may also be determined for different stabilizer configurations. Specifically, the wellbore hydraulics simulator 302 (FIG. 3) may process or analyze possible scenarios, plans or processes having different stabilizer configurations or, more generally, drillstring geometries to provide outputs that may be used to solve and/or determine fluid mechanics equations for a borehole being drilled.

One or more of the simulators 302-308 may also be used to determine the efficiencies associated with scenarios, plans or processes involving different sampling operations. For example, the relative efficiencies of scenarios, plans or processes that sample while drilling has been temporarily suspended, that sample while tripping a bottomhole assembly (e.g., the BHA 100 of FIG. 1) out of a borehole (e.g., the borehole 11 or FIG. 1) after the total borehole depth has been drilled, and/or that sample using a wireline tool may be determined. Further, different sample times may be associated with sampling parameters that may be utilized by the formation flow simulator 306 to generate outputs used to determine the contamination level of the sampled fluid and/or other reservoir-related data.

Still further, the possible scenarios, plans or processes may be evaluated or analyzed to determine the effect(s) (e.g., on sampling efficiency) of using different types of drilling fluids. Specifically, for example, information representing the different types of drilling fluids may be utilized by the wellbore hydraulics simulator 302, the mudcake simulator 304, the formation flow simulator 306 and/or the tool response simulator 308 to generate outputs used to determine whether the cost of using an alternate mud during the drilling and/or sampling process is justified. Similarly, one or more of the simulators 302-308 may be used to determine the effects of different drilling fluid flow rates. For example, different drilling fluid flow rate histories may be associated with drilling parameters that may be utilized by the wellbore hydraulics simulator 302 (FIG. 3) to generate outputs used to solve and/or determine equations of fluid mechanics in a borehole.

More generally, the identified possible scenarios, plans or processes and the related parameters and parameter values are processed by the simulation engine 240 and/or the processing unit 250 to generate predictions associated with sampling a formation. Such predictions may be generally associated with efficiency(-ies) and/or cost(s) of the sampling operation(s). Further, predictions relating to the dynamics of drilling fluid invasion for each of the identified possible scenarios, plans or processes may be generated. For example, the processing unit 250 and/or the simulation engine 240 may process seismic data and/or openhole log data to determine an estimate of formation pore pressure along a borehole trajectory. Similarly, the openhole log data may be processed via the processing unit 250 and/or the simulation engine 240 to determine, along the borehole trajectory, formation porosity, formation lithology, formation structural information, the type of formation fluid, formation fluid saturation and/or estimates of permeability, etc. Further, the simulation engine 240 and/or the processing unit 250 may process data relating to the rock mechanical properties to estimate a rate of penetration of a drill bit 105 in a formation and/or for identifying and/or determining limits for a pumping rate of a formation fluid during sampling via, for example, a pump (e.g., the pump 280 of FIG. 2).

After the simulation engine 240 and/or the processing unit 250 have processed or analyzed the possible scenarios, plans or processes and the related parameters and parameter values, the sorter 314 (FIG. 3) sorts and/or ranks the predictions associated with the different scenarios, plans or processes. The sorter 314 may rank the processes (e.g., the scenarios) according to the sample fluid quality (e.g., a final sample quality), the duration of the sampling process, the cost associated with the sampling process (e.g., the cost of sampling), and/or according to the amount of risk associated with obtaining the fluid sample. Additionally, the sorter 314 may enable the identification of the parameter(s) (e.g., the drilling and/or sampling parameters(s)), which have the greatest impact on the sample fluid quality. Further, the comparator 310 may compare the predictions associated with the different scenarios, plans or processes to identify scenarios, plans, processes and/or parameters that reduce the cost of sampling, increase sample fluid quality and/or reduce the sampling process duration.

After the sorter 314 sorts and/or ranks the predictions associated with the different scenarios, plans or processes, the processing unit 250 plans drilling and sampling operations based on the ranked predictions. In particular, based on the ranked predictions, the processing unit 250 may identify a bottomhole assembly configuration, a type of drilling fluid, drilling practices to be employed, a time at which the drilling operation is to be temporarily suspended to obtain a fluid sample, a location or locations at which the drilling operation is to be temporarily suspended to obtain a fluid sample, a drilling fluid circulation rate, a formation fluid sampling rate, a duration of pumping of formation fluid, a sampled fluid composition, whether the sample(s) is/are to be obtained after drilling has been suspended or while tripping a bottomhole assembly out of a borehole.

Once the initial drilling and/or sampling operations have been planned at block 504, the example process 500 initiates drilling (block 506) in accordance with the initial plan. Data may then be gathered during execution of the drilling plan. Specifically, the example process 500 may collect drilling data while drilling (block 508). For example, during drilling, the LWD tools 120, 120A (FIG. 1) and/or the sensors 235 may be used to measure parameters associated with an actual rate of penetration of the drill bit 105, an amount of movement of the bottomhole assembly 100 (FIG. 1) and/or a rotational speed of the bottomhole assembly 100 (FIG. 1), each of which may be utilized by the wellbore hydraulics simulator 302 (FIG. 3) to update and/or refine a hydraulic flow history in the borehole 11. Additionally or alternatively, the measured parameters may be associated with an actual drilling fluid pump flow rate (e.g., drilling fluid flow rate), which may be utilized by the wellbore hydraulics simulator 302 to update and/or refine the hydraulic flow history in the borehole 11. Further, the measured parameters may be associated with an actual borehole trajectory, which may be utilized by the wellbore hydraulics simulator 302 to update and/or refine a formation pressure estimate along the borehole 11. Further still, the measured parameters may be associated with drilling fluid loss and/or logging while drilling shallow measurements, each of which may be utilized to estimate a fluid invasion profile, to calibrate a drilling fluid model, to calibrate a mudcake model and/or to calibrate a formation model. Further, the measured parameters may be associated with a downhole pressure and a downhole temperature, which may be analyzed and compared to the outputs and/or predictions from the simulation engine 240 (FIG. 2). Based on the measured parameters, the drilling fluid rheology parameters and the downhole temperature may be adjusted to achieve similarity between the predictions generated by the simulation engine 240 and the measurements obtained by the LWD tools 120, 120A and/or the sensors 235. Additionally, measurements may be performed on the drilling fluid and/or the cuttings from the formation F uphole, which may be utilized by the formation flow simulator 306 to update and/or refine the formation model and/or by the wellbore hydraulics simulator 302 to update and/or refine the mudcake model.

While drilling is occurring, the example process 500 may determine whether a preliminary or initial sample should be taken (e.g., a preliminary test should be performed) (block 510). For example, the comparator 310 (FIG. 3) may compare the values of parameters measured while drilling (e.g., data collected at block 508) to predictions generated by the simulation engine 240 to determine if a sampling target location has been reached. The sampling target location may be considered reached when the measurements made by the LWD tools 120, 120A and/or the sensors 235 indicate that the formation being drilled contains a fluid of interest and the formation properties are suitable for sampling as determined or predicted by the simulation engine 240.

If the processing unit 250 (FIG. 2) and/or the processor 316 (FIG. 3) determine that the sampling target has been reached, the probe 205 (FIG. 2) of the LWD tool 200 may be set at that location (block 512) and controlled to engage the borehole wall 220 to obtain a sample from the formation F (block 514). During the initial sampling operation (e.g., preliminary test) (block 514), measurements are performed to obtain actual measurements of the formation and/or formation fluid via the fluid measurement unit 230 and/or the sensors 235. Some of the actual measurements may be associated with formation response measurements to a drilling operation. In particular, some of the actual measurements, along with other logging while drilling data and/or drilling fluid data, may be utilized to update and/or refine a mudcake model and/or to establish and/or modify a formation model. In general, the operations performed at blocks 508-514 involve gathering data during execution of a drilling plan and, thus, correspond generally to block 404 of FIG. 4.

At the completion of the initial sampling process (e.g., a preliminary test), the actual measurements made at blocks 508 and 514 may then be processed via the simulation engine 240 to update the planned sampling operation based on the actual measurements (block 516). In particular, the wellbore hydraulics simulator 302, the mudcake simulator 304, the formation flow simulator 306 and the tool response simulator 308 may be used to re-evaluate the different possible scenarios, plans, or processes using the actual measurements along with, for example, process parameters, drilling parameters, sampling parameters, reservoir parameters and/or drilling fluid parameters. The scenarios may be associated with operating parameters such as, for example, a drilling fluid circulation rate during sampling and/or a time after drilling. During processing of the actual measurements (block 516), the probe 205 may or may not be disengaged from the borehole wall 220. The operation(s) performed at block 516 correspond generally to block 406 of FIG. 4.

After updating the initial sampling plan at block 516, the example process 500 then initiates execution of the updated sampling plan (block 518). More specifically, the initiator 312 (FIG. 3) may initiate and/or execute the sampling operation based on the ranked predictions associated with the different scenarios, plans or processes. In particular, the sampling operation may be performed based on the sampling parameters that are associated with a desired sampling objective such as, for example, a sample fluid quality, a sampling process duration and/or a cost of sampling, etc. If disengaged the probe 205 (FIG. 2) is disengaged from the borehole wall 220 during the processing of the actual measurements (block 516), the probe 205 (FIG. 2) of the LWD tool 200 engages the borehole wall 220 to obtain a sample from the formation F. In either case, the fluid measurement unit 230 and/or the sensors 235 then obtain actual measurements from the formation fluid sample. Some of the actual measurements may include a pressure and/or a temperature response of the formation F and/or physical properties of the fluid sample such as, for example, composition, saturation pressures, density, viscosity, resistivity and/or conductivity, nuclear magnetic resonance measurements and/or optical spectral properties.

After initiating the sampling operation at block 518, the example process 500 may measure the formation response and/or fluid properties (block 520), interpret the formation response and/or fluid properties (block 522), and control the sampling operation based on the interpreted formation response and/or fluid properties (block 524). The example process 500 then determines whether sampling is complete (block 526) and, if sampling is not complete, then the example process 500 updates the sampling operation (block 528) and returns control to block 520 to continue the sampling process. Thus, in general, the operations at blocks 520-528 generally correspond to block 408 of FIG. 4. Also, generally, the operations at blocks 520-528 enable the sampling process to be managed dynamically or on a real-time basis and to iterate one or more sampling and/or drilling parameters to improve or optimize the sampling operation. In this manner, one or more sampling parameters may be adjusted dynamically and/or one or more drilling parameters (e.g., drilling fluid flow rate) may be adjusted dynamically to improve the effectiveness and/or efficiency of the sampling operation(s).

Turning now in more detail to blocks 520-528, the measurement of the formation response and/or measurement of fluid properties at block 520 may be performed using the fluid measurement unit 230 (FIG. 2) and/or the sensors 235 (FIG. 2). For example, the fluid measurement unit 230 and/or the sensors 235 may measure the pressure, the temperature, the flow rate of the sampled fluid, fluid sample composition and/or fluid sample properties. The fluid measurement unit 230 and/or the sensors 235 may also, for example, be used to determine an extent of drilling fluid infiltration in the formation F (FIG. 2).

The interpretation of the formation response and/or fluid properties measured at block 520 may be performed using one or more of the simulators 302-308 of the simulation engine 240 and/or using the processing unit 250. For example, the simulation engine 240 and/or the processing unit 240 may process the mudcake parameters, the reservoir parameters, the tool response parameters and/or the data associated with the wellbore hydraulics model to generate simulation outputs. The simulation engine 240 and/or the processing unit 240 may also process the actual measurements (e.g., the formation and/or mudcake parameters) along with the sampling parameters to calculate, determine and/or predict a theoretical response to the sampling process. Actual measurements may include an extent of the invaded zone of the formation F by the drilling fluid, a radial saturation profile, composition of the sampled fluid, mudcake permeability, formation permeability, relative mobility of the drilling fluid filtrate, relative mobility of the pristine formation fluid, tool operating parameters and/or sampling parameters. The comparator 310 (FIG. 3) may then compare the actual response of the formation, which was identified by the fluid measurement unit 230 and/or the sensors 235, to the theoretical response of the formation determined by the simulation engine 240 (FIG. 2) and/or the processing unit 240 (FIG. 2). Based on the comparison, the processing unit 240 may identify and/or determine what drilling and/or sampling parameter(s) may be changed to better control the sampling process to match the planned or desired sampling operation or process target parameter values. For instance, formation properties, drilling fluid properties and/or the temperature and/or pressure in the borehole 11 may be identified for possible adjustment. This comparison may also be utilized to diagnose and/or identify tool operation issues and/or failures. Additionally or alternatively, the weight-on-bit, the flow rate of the drilling fluid, the rotational speed of the bottomhole assembly 100 and/or the drilling fluid properties may be identified for possible adjustment. Adjustment of a drilling fluid may, for example, involve introducing (at a later stage in the drilling operation) additives to the drilling fluid.

The information provided by the interpretation of the formation response and fluid properties data at block 522 is then used to control the sampling operation at block 524 in real time. For example, real time control over the sampling operation may be achieved by controlling a sampling pump, estimating an amount of contamination, estimating a volume to be pumped to reach a targeted contamination level and/or controlling a time at which the sample is routed to a sample chamber and/or bottle. More generally, the sampling operation may be controlled based on the adjusted formation properties and/or the adjusted drilling fluid properties to improve the sampling process. Improving the sampling process includes increasing a sample quality and/or reducing a cost, which may be associated with the sampling and/or drilling operation. Specifically, the flow rate of the drilling fluid, may be reduced if excessive mudcake erosion is detected. Alternatively, the flow rate of the drilling fluid may be increased if the quality of the mudcake is determined to be acceptable. Additionally, the flow rate of the drilling fluid may be increased if the flow regime around the drillstring 12 (FIG. 1) is determined to be acceptable.

Updates to the sampling operation performed at block 528 may be based, at least in part, on the adjusted formation fluid properties. Alternatively and/or additionally, the actual measurements may be utilized to update the parameters utilized by the simulation engine 240 (FIG. 2). The predictions generated by the simulation engine 240 may be associated with a history of the pumped fluid contamination as a function of time and/or the volume of fluid pumped from the formation. In other examples, the predictions generated by the simulation engine 240 may be a history of the pumped fluid composition as a function of a volume of fluid pumped from the formation and/or time. Additionally or alternatively, the predictions generated by the simulation engine 240 may be associated with predicting an expected formation response to, for example, a particular sampling operation. The predictions and/or outputs generated by the simulation engine 240 may be compared to the actual measurements obtained by the fluid measurement unit 230 and/or the sensors 235 to identify and/or diagnose tool operating failures and/or to determine whether one or more of the parameters in the one or more models used in the simulation need to be modified.

If, at block 526, the example process 500 determines that sampling is finished or complete in accordance with the dynamically updated sampling plan, the process 500 determines if the drilling operation or job is complete or finished (block 530). If the drilling operation is complete at block 530, control may be passed to block 534, at which a post job interpretation of formation response and fluid property data is performed. Otherwise, control may be passed to block 532, at which drilling and/or tripping activities are resumed and control is passed back to block 508. Likewise, if the example process 500 determines at block 510 that sampling is not to be performed, control is passed to block 530.

FIGS. 6-13 are graphs that depict simulation outputs and/or predictions generated by the wellbore hydraulics simulator 302, the mudcake simulator 304, the formation flow simulator 306 and the tool response simulator 308. Generally, FIGS. 6, 8 and 10 correspond to predictions associated with a first sampling scenario, plan or process and FIGS. 7, 9 and 11 correspond to predictions associated with a second sampling scenario, plan or process. The first sampling scenario may be associated with a sampling operation at a location in the borehole 11 after a substantial time has elapsed since the drill bit 105 first passed that location. For example, the drillstring 12 may be on its way out of the borehole or it may have been removed from the borehole 11 and reentered the borehole 11 or it may have been replaced with another sampling device such as, for example, a wireline sampling tool. In contrast, the second sampling scenario may be associated with a sampling operation at the same location as the first sampling scenario, but just after the sampling location has been reached by the sampling tool (e.g., the LWD tool 200) for the first time.

The simulation engine 240 is utilized to determine, which of the two sampling scenarios, plans or processes is favorable to obtain a sample having the least amount of contamination in a fixed time allotted for sampling. As discussed below, the first sampling scenario has some advantages and some disadvantages. For example, in the first sampling scenario, the mudcake is well formed in the borehole 11. However, the depth of the drilling fluid invasion may be relatively high. Similarly, the second sampling scenario has some advantages and some disadvantages. For example, in the second sampling scenario, the depth of the drilling fluid invasion may be relatively low. However, the mudcake is not well formed (e.g., immature) on the borehole wall 220.

Figure 6:
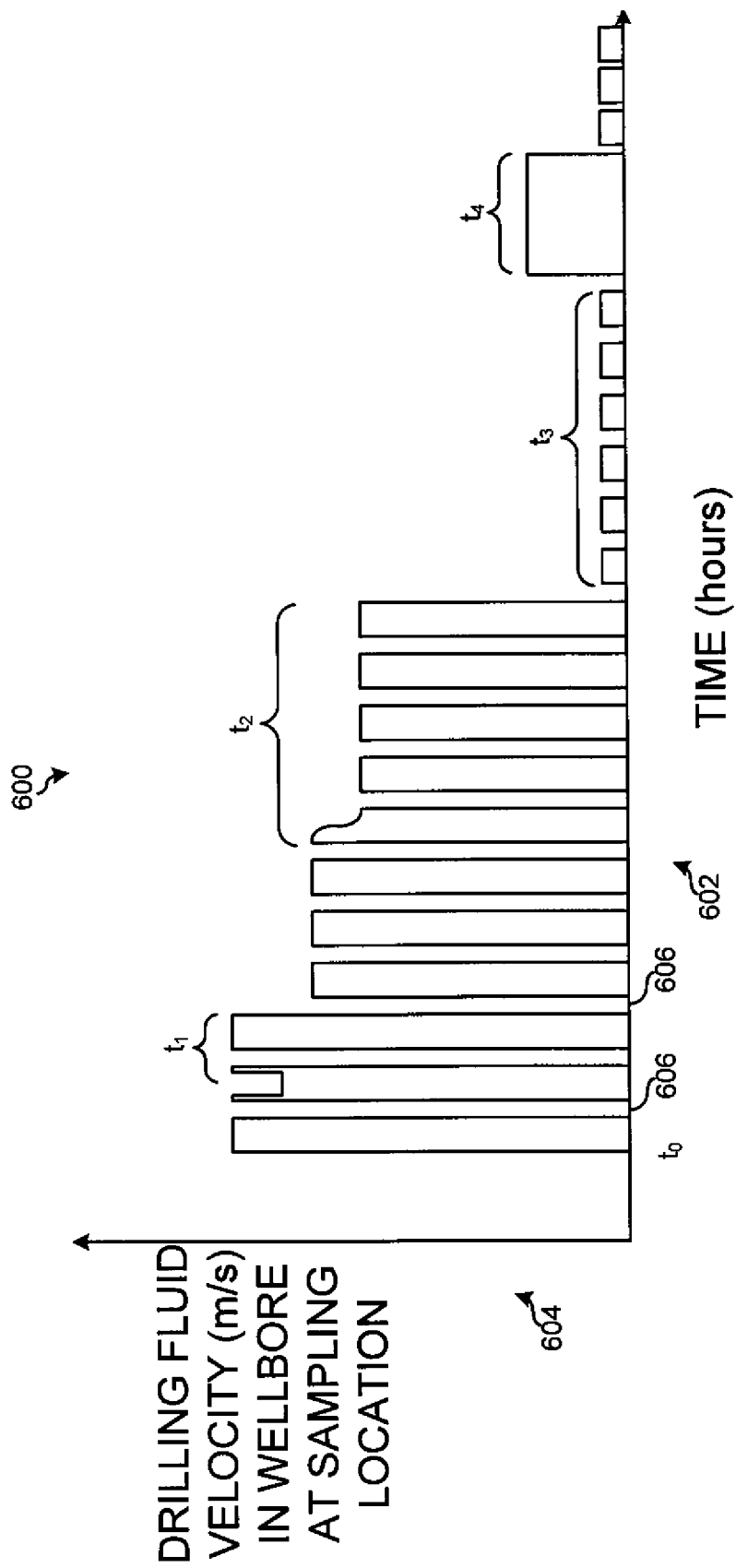
FIGS. 6-13 depict graphs that illustrate predictions according to one or more aspects of the present disclosure.
Figure 7:
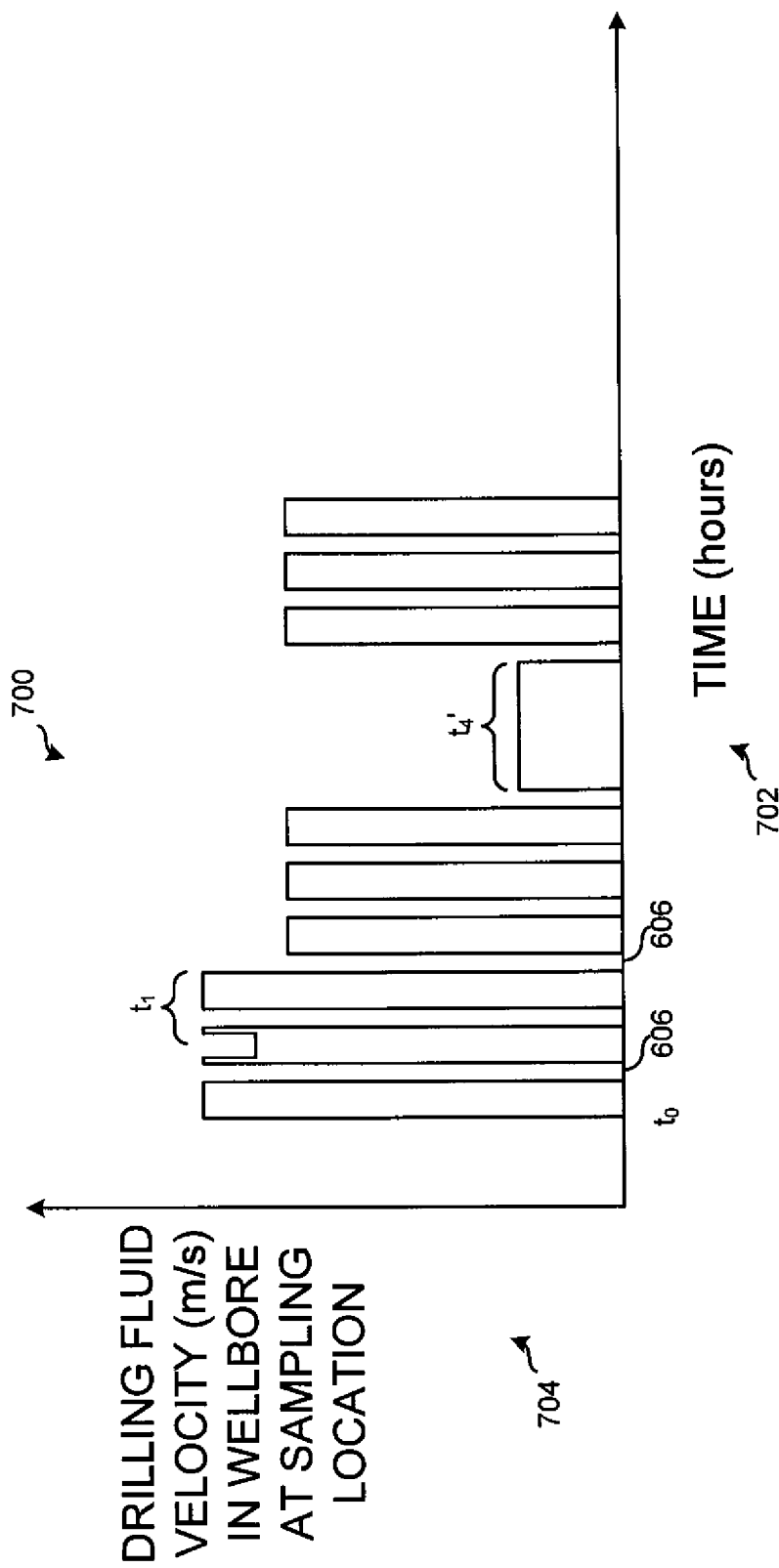

Turning to FIGS. 6 and 7, graphs 600 and 700 represent the drilling fluid circulation rate as a function of time. In each of the graphs 600 and 700, the time at which the sampling location is first reached by the drill bit 105 is represented by t0. The x-axis 602 and 702 of each of the graphs 600 and 700 is associated with time and the y-axis 604 and 704 of each of the graphs 600 and 700 is associated with a velocity (e.g., drilling fluid circulation rate) of the drilling fluid in the borehole 11 at a sampling location. Gaps 606 in FIG. 6 or FIG. 7 illustrate a drilling fluid circulation rate decrease (e.g., annular velocity of the drilling fluid) when, for example, additional drill pipe sections are added to the drillstring 12. The time period represented by t1 represents the time at which the stabilizer (e.g., the stabilizer blade 215 of the LWD tool 200) passes the sampling location.

With reference to FIG. 6, the time period between t1 and t2 represents the time at which the drill collars are positioned adjacent the sampling location. The time period represented by t2 represents the time at which the drill pipe is adjacent the sampling location. The position of the drill pipe relative to the sampling location indicates that the drill bit 105 continued to drill the formation F even after the sampling location was reached. In this particular example, the desired depth of borehole to be drilled during this particular drilling operation is reached at the end of time period t2 and a sample is to be acquired at the chosen sampling location while removing the drillstring 12 from the borehole 11. After or while the drillstring 12 is removed from the borehole 11, the drilling fluid circulation is typically stopped, which is represented by the time period t3. While the drilling fluid circulation is stopped during this time period, the drilling fluid may have a small velocity due, at least in part, to the action of the drillstring on the borehole fluid. This drillstring action is typically referred to as swabbing. The sampling probe 205 (FIG. 2) reaches the sampling depth at the beginning of the time period represented by t4, at which time the drilling fluid circulation is reinitiated to provide power to the bottomhole assembly 100 (FIG. 1) and/or the LWD tool 200 (FIG. 2) while the sampling operation takes place. After the sampling operation has been completed at the end of t4, the procedure to remove the drillstring from the borehole is resumed.

FIG. 7 illustrates that the drilling operation (e.g., drilling) continues until the probe 205 (FIG. 2) reaches the sampling location, at which point the sampling operation is initiated. During the sampling operation, represented by time period t4', the drilling fluid circulation rate may be reduced. After the sampling operation is completed, drilling is reinitiated in the borehole 11. In contrast, FIG. 6 illustrates that the drill bit 105 continues to drill the formation F for a time period after the sampling location is reached and the sampling operation is performed while tripping out of the borehole 11.

Figure 8:
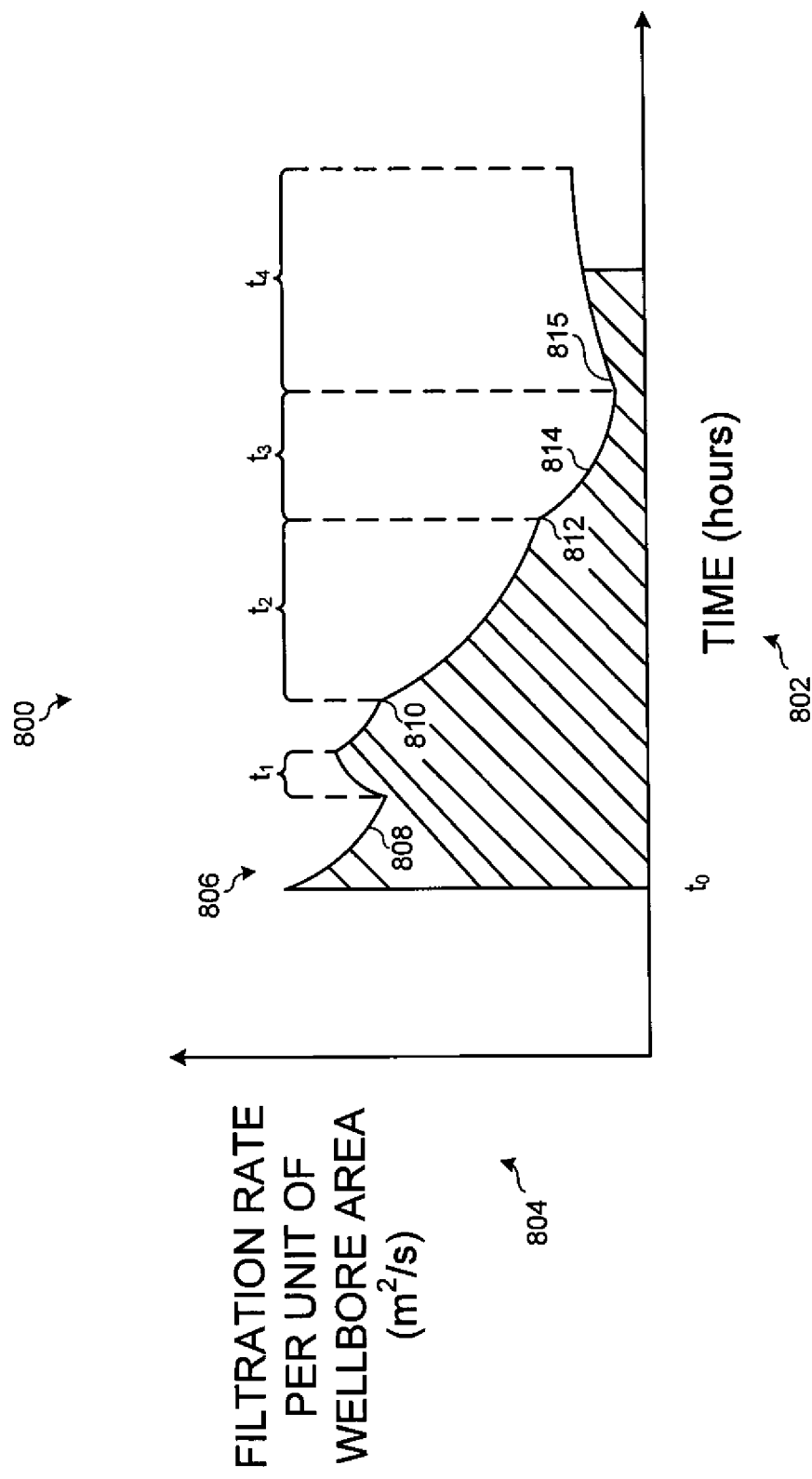
Figure 9:
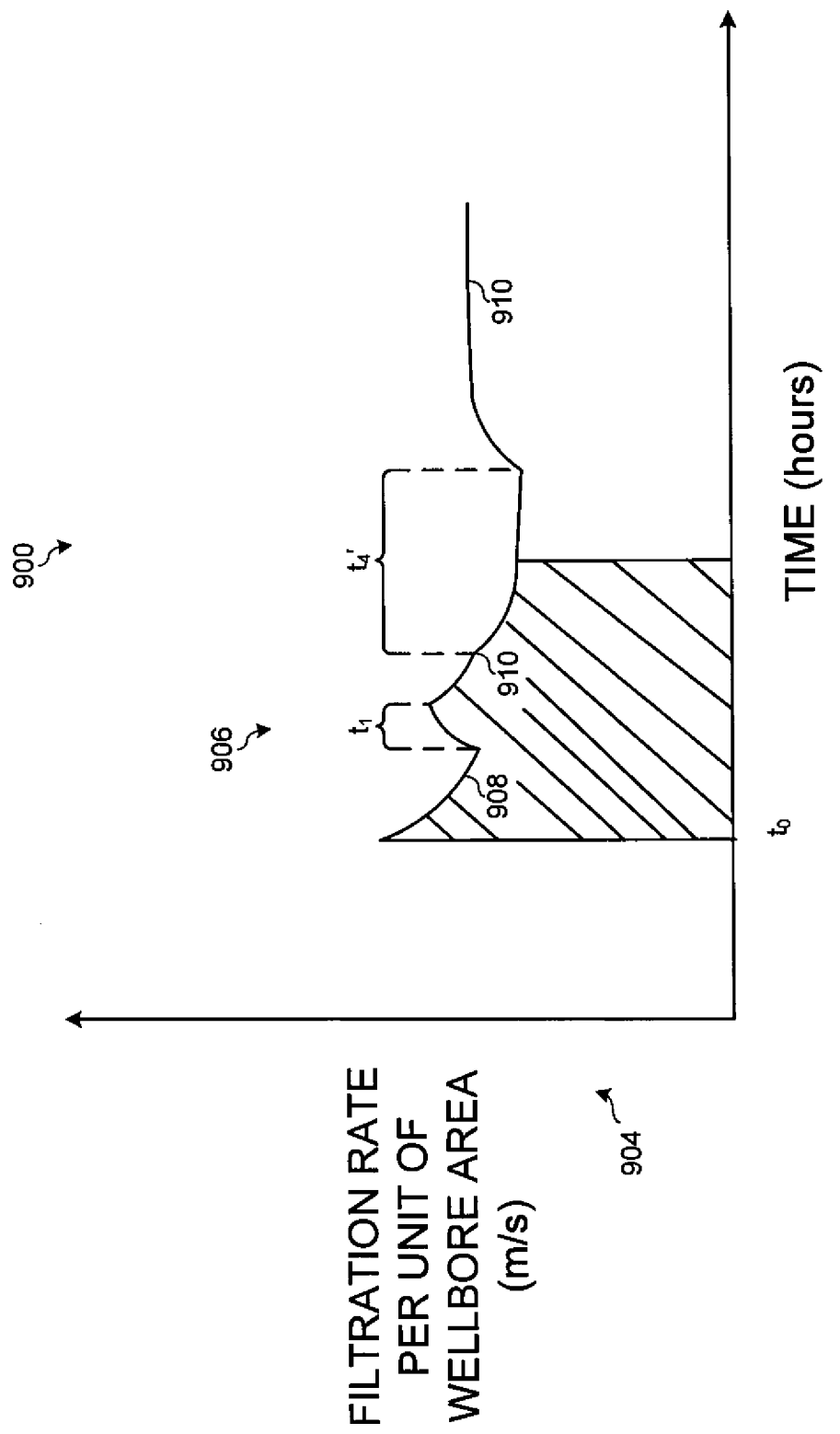

FIGS. 8 and 9 depict graphs 800 and 900 that represent a filtration rate of drilling fluid into the formation at the sampling location as a function of time. The x-axis 802 and 902 of each of the graphs 800 and 900 is associated with time and the y-axis 804 and 904 of each of the graphs 800 and 900 is associated with a filtration rate of drilling fluid per unit of the borehole 11. The area beneath the curves sections 806 and 906, which is depicted by the shaded area, represents the total volume of drilling fluid that has invaded the formation F prior to the initiation of the sampling operation. As shown in FIG. 8, the amount of drilling fluid invasion is relatively high prior to the initiation of the sampling operation (e.g., the time period represented by t4). In contrast, as shown in FIG. 9, the amount of drilling fluid invasion is relatively low prior to the initiation of the sampling operation (e.g., the time period represented by t4'). In each of the graphs 800 and 900, the time at which drilling fluid initially invades (e.g., spurts into) the formation F as the drill bit 105 cuts into the formation F is represented by t0. As depicted by curve sections 808 and 908, after the formation (e.g., rock) is cut by the drill bit 105 (FIG. 1), mudcake begins to form on the borehole wall 220, which reduces the filtration rate (e.g., the rate at which the drilling fluid filtrate invades the formation).

Turning initially to FIG. 8, in operation, a first dynamic filtration rate 810 is achieved based, at least in part, on the position of the collar in the borehole 11, the cross-section of the collar, and the circulation rate of the drilling fluid and properties of the drilling fluid. As the drillstring 12 becomes adjacent and/or passes the sampling location, a second dynamic filtration rate 812 is achieved based, at least in part, on the position of the drillstring 12 in the borehole 11, the cross-section of the drillstring 12, the circulation rate of the drilling fluid and properties of the drilling fluid. Then, as the drillstring 12 is removed from the borehole 11, the filtration rate decreases until it is substantially static, which is represented by curve section 814. However, the filtration rate increases 815 as the drilling fluid circulation is increased to provide power to the bottomhole assembly 100 and/or the LWD tool 200 while the sampling operation takes place.

Turning now to FIG. 9, in operation, the filtration rate of the second sampling scenario is similar to the first sampling scenario until the time period represented by t2, at which, in the first sampling scenario, the drill bit 105 continues to drill the formation F even after the sampling location is reached. In contrast, in the second sampling scenario, when the sampling location is reached, the sampling operation is initiated. As a result, a first dynamic filtration rate 910 is substantially maintained during the sampling operation. Initiating the sampling operation once the sampling location is reached, results in the dynamic filtration rate 910 being relatively high, but the total volume of the drilling fluid that has invaded the formation being relatively low.

Figure 10:
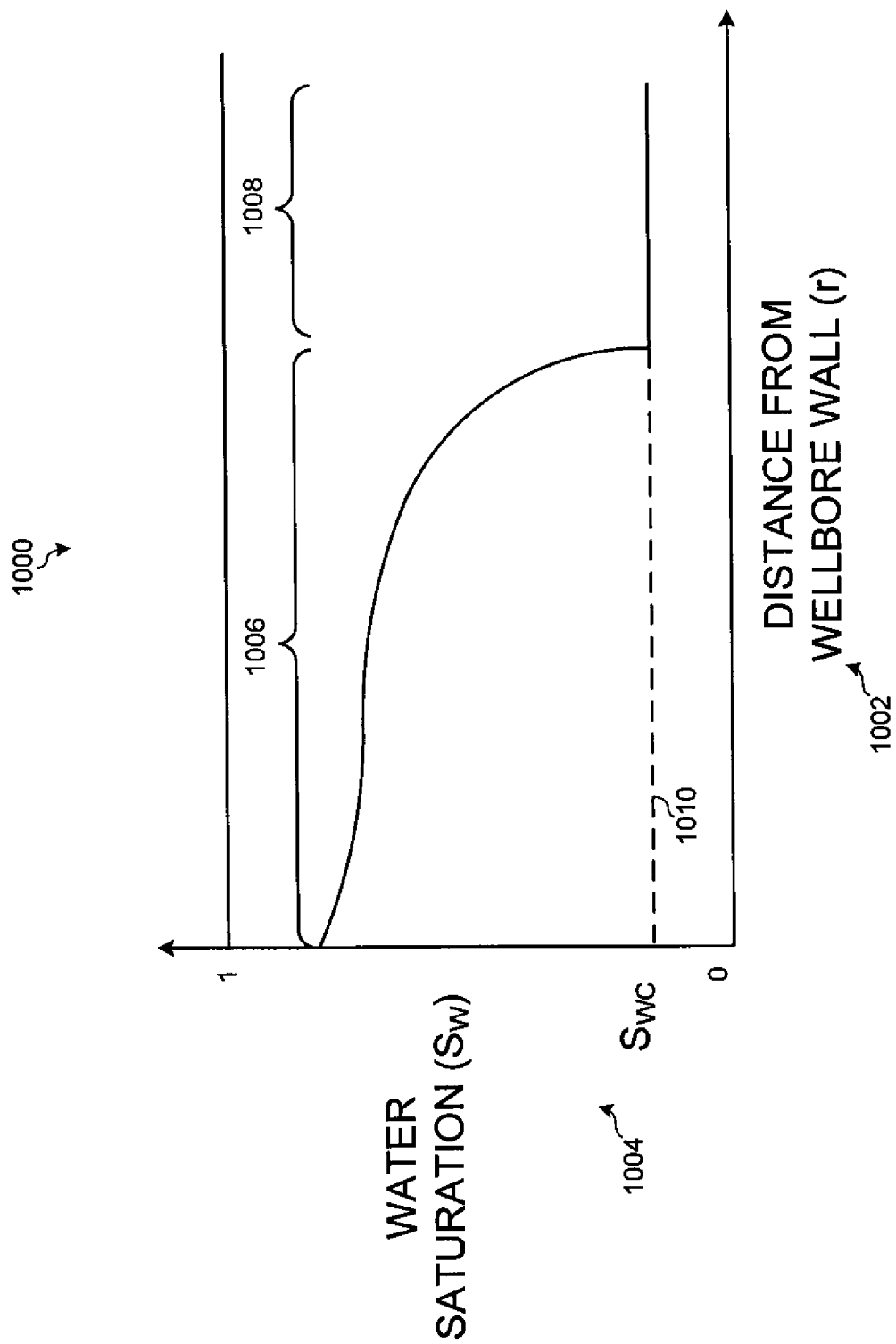
Figure 11:
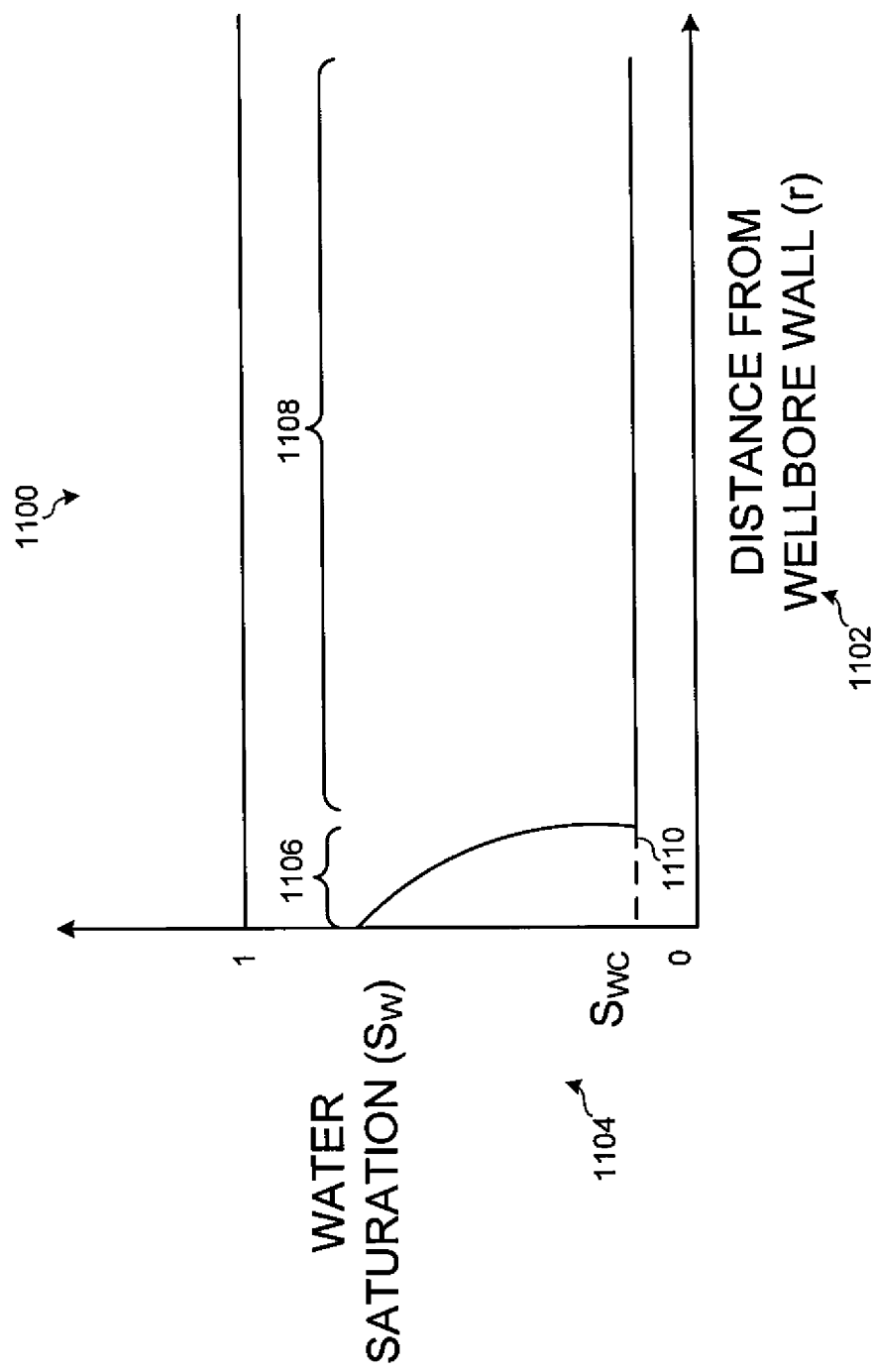

FIGS. 10 and 11 depict graphs 1000 and 1100 that represent a point in time (e.g., a snap shot) of the fluid saturation in the formation F prior to the sampling operation. The x-axis 1002 and 1102 of each of the graphs 1000 and 1100 is associated with a distance from the borehole wall 220 and the y-axis 1004 and 1104 of each of the graphs 1000 and 1100 is associated with a mud filtrate saturation level, depicted in FIGS. 10 and 11 as if the drilling fluid was a water-based mud. Additionally, a first curve section 1006 and 1106 represents a zone of the formation invaded by drilling fluid filtrate and a second curve section 1008 and 1108 represents a zone of the formation having pristine formation fluid (e.g., connate formation fluid). Further, a dashed line 1010 and 1110 represents a connate-water saturation level in the formation.

FIG. 10 depicts the first sampling scenario in which the sampling operation is initiated at a later time period as compared to the second sampling scenario. As a result, the drilling fluid invasion depth into the formation is relatively high. However, as a result of mature (e.g., good) mudcake, the drilling fluid filtration rate is relatively low.

FIG. 11 depicts the second sampling scenario in which the sampling operation is initiated at an earlier time period as compared to the first sampling scenario. As a result, the drilling fluid invasion depth into the formation is relatively low. However, as a result of immature mudcake (e.g., not completely formed), the drilling fluid filtration rate is relatively high.

Figure 12:
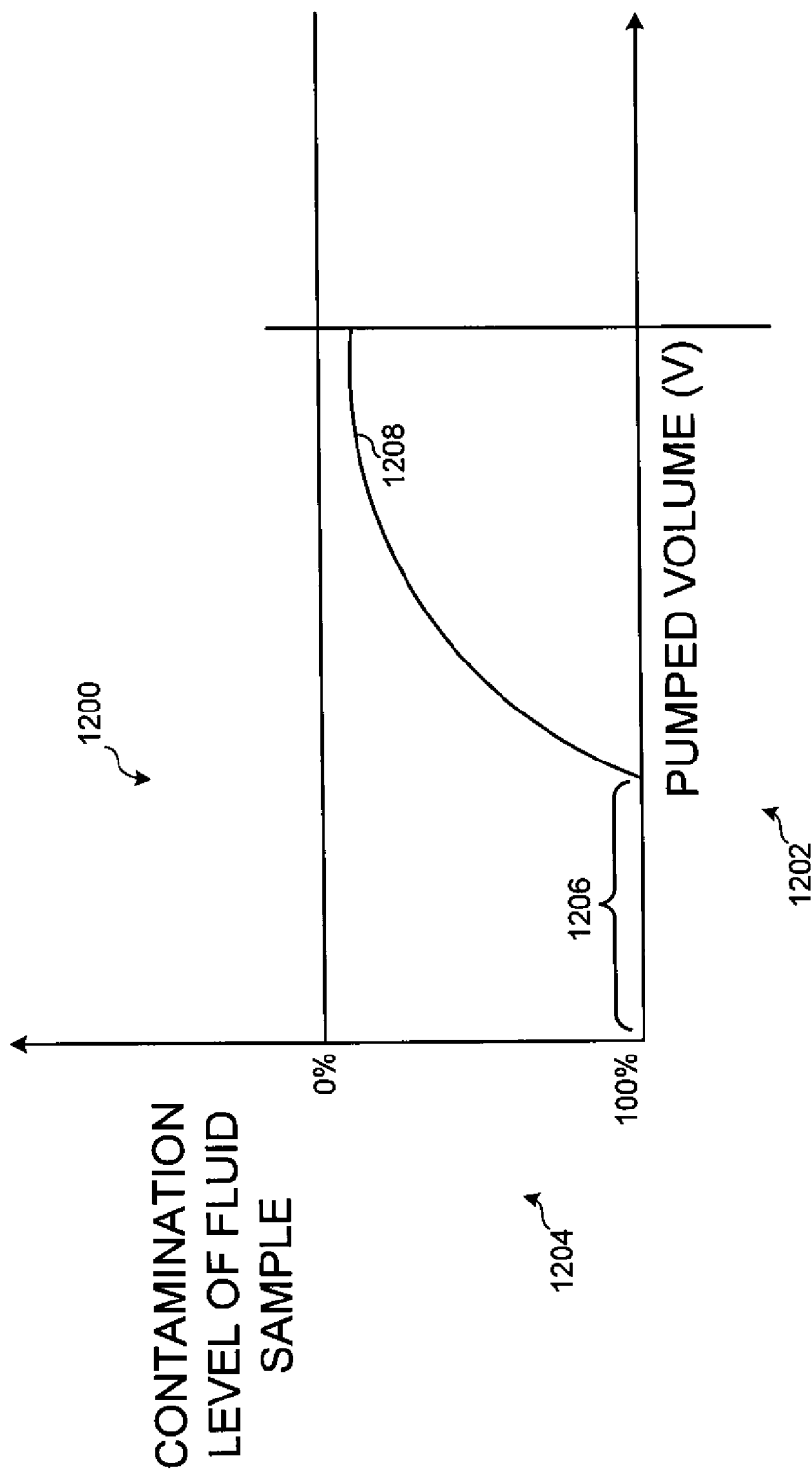
Figure 13:
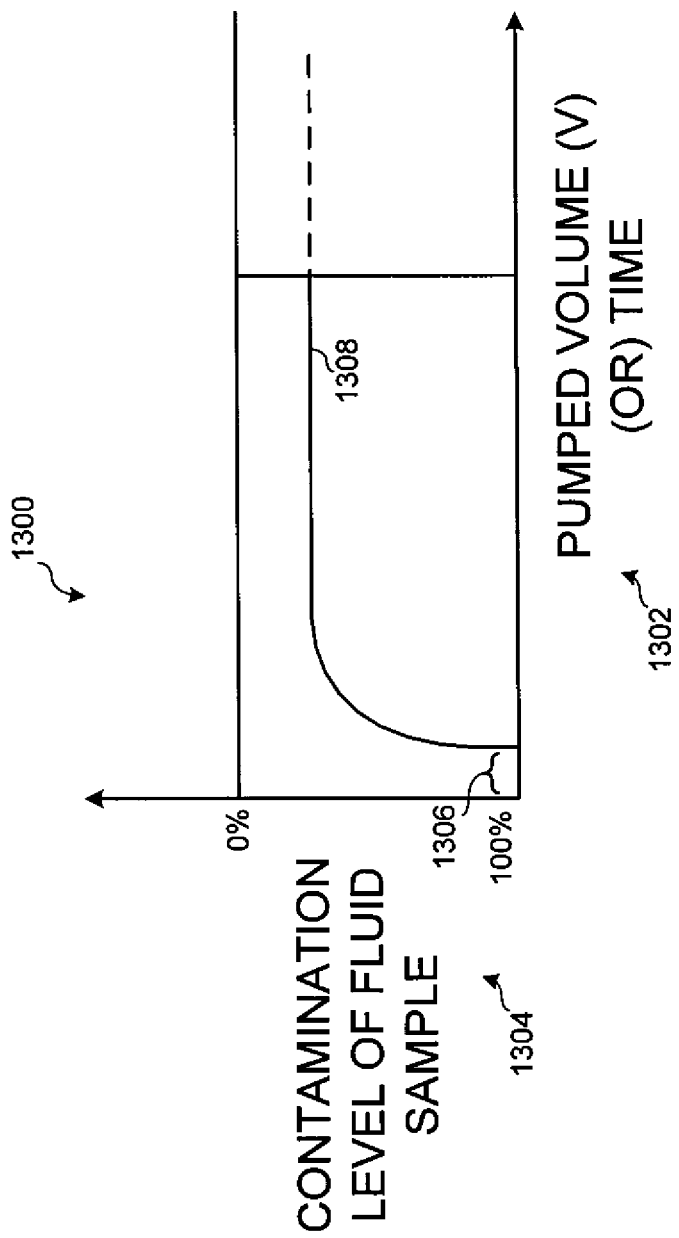

FIGS. 12 and 13 depict graphs 1200 and 1300 that represent an example relationship between a contamination level of the fluid sample as a function of the volume of the sampled fluid pumped from the formation that may be generated by the formation flow simulator 306. The sampling parameters used to obtain the results associated with both graphs 1200 and 1300 are similar or the same. However, the time at which the sampling operation occurred after drilling is different. The x-axis 1202 and 1302 of each of the graphs 1200 and 1300 is associated with the pumped volume of formation fluid and the y-axis 1204 and 1304 of each of the graphs 1200 and 1300 is associated with a drilling fluid filtrate contamination level of the fluid sample. The pumped volume of the formation fluid is associated with time and a pumping rate.

In operation, initially, depending on the particular properties of the formation and formation fluid being sampled, a volume of drilling fluid filtrate may be pumped (e.g., a breakthrough volume) before any formation fluid (e.g., oil) enters the sampling tool (e.g., the LWD tool 200). The breakthrough volume is generally represented by brackets 1206 and 1306. As shown in FIG. 12, the breakthrough volume is relatively large. In contrast, as shown in FIG. 13, the break through volume is relatively small. The curved sections 1208 and 1308 represent a cleanup trend, which is associated with an increase in fluid quality entering the sampling tool. FIG. 12 represents the situation where the cleanup trend was determined by assuming that the sampling operation was performed a substantial time after the sampling depth had been drilled. As a consequence, the mature mudcake provides an effective barrier to infiltration of drilling fluid filtrate during the pumping operation. Although the clean up rate is slow, ultimately a low level of contamination may be achieved after a sufficient volume has been pumped. FIG. 13 represents the situation where the sampling operation is performed relatively soon after the sampling depth has been reached. In this case the mudcake is still forming and does not provide an effective barrier to the infiltration of drilling fluid filtrate through the borehole wall. Although the initial cleanup trend is relatively rapid, a limit to the minimum level of sampled fluid contamination is reached at the chosen pumping rate.

Figure 14:
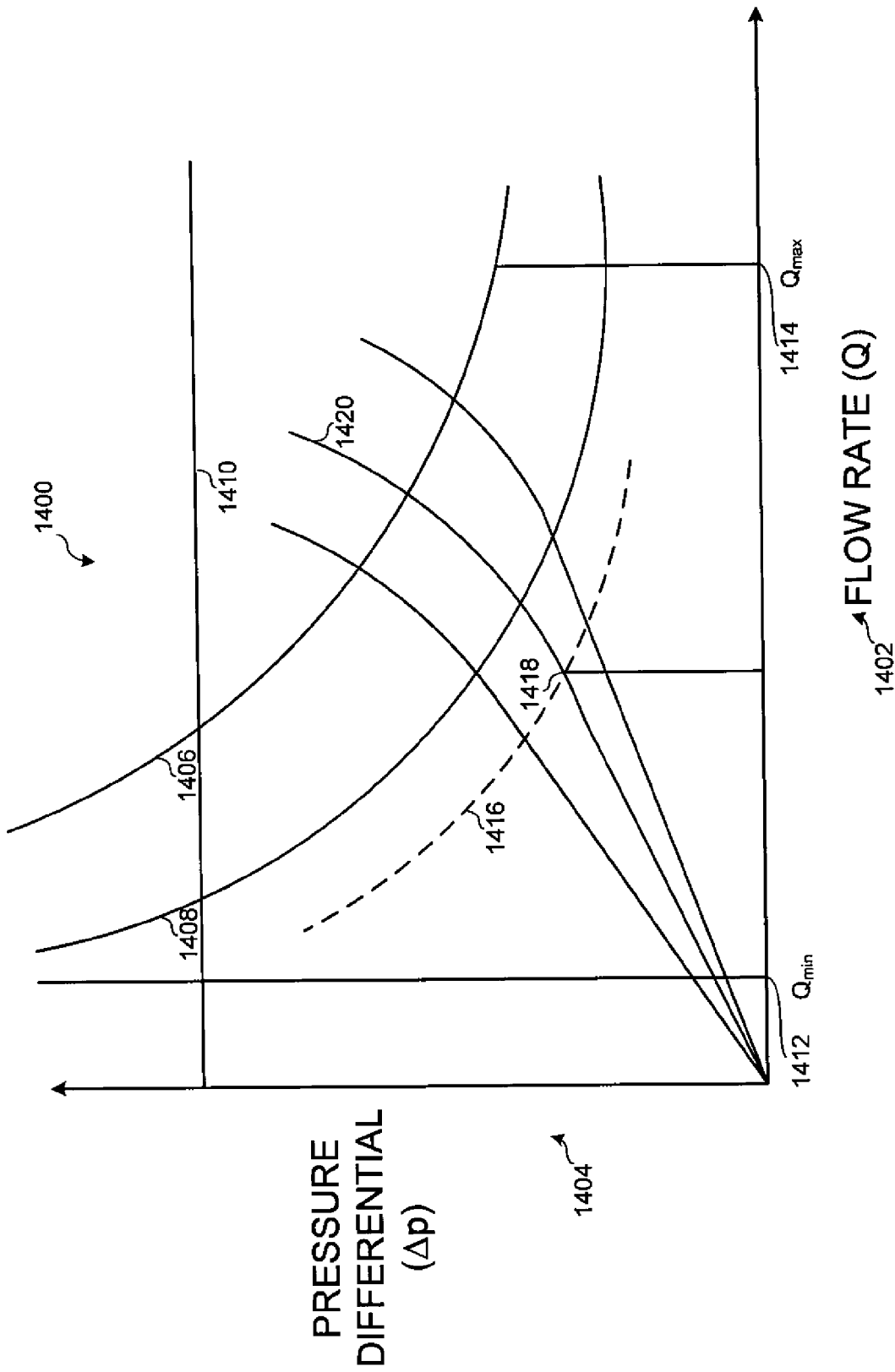
FIG. 14 depicts a graph that illustrates an example output from a sampling tool response simulator relating to a possible tool operating envelope.

FIG. 14 depicts a graph 1400 that represents the relationship between a pressure differential and the pumping flow rate. The pressure differential when referring to the formation response is determined by measuring the pressure in the sample flowline at the probe (e.g., the probe 205) and taking the difference of this measurement with the formation pressure. The pressure difference of relevance to the pump is the difference in pressures measured at the probe (e.g., probe 205) and at a point in the sample flowline at the outlet of the pump (not shown). The x-axis 1402 of graph 1400 is associated with the pumping flow rate and the y-axis 1404 of the graph 1400 is associated a pressure differential.

In operation, as discussed above, the formation pressure may be estimated by performing a pretest operation prior to initiating the sampling operation. Alternatively, the formation pressure may be estimated by evaluating reservoir surveys (e.g., seismic and/or sonic surveys) or from measurements performed in offset wells.

Graph 1400 includes a plurality of curves 1406 and 1408 and lines 1410, 1412 and 1414 that define the operating envelope for the pumping system, each of which may be determined by the tool response simulator 308. Line 1410 represents a pressure limit, which may be imposed by the components of the bottomhole assembly 100 and/or the LWD tool 200 (e.g., pumping hardware). The pressure limit may be a function of the borehole 11 pressure if, in the extreme case, the formation is depleted or has a very low mobility. Alternatively, the line 1410 may represent a pressure limit related to a fluid property, for example a saturation pressure, which if exceeded may result in the breakdown of the fluid resulting in an unrepresentative sample. Lines 1412 and 1414 represent the minimum pumping flow rate and the maximum pumping flow rate, respectively. The minimum and/or maximum pumping flow rates may be determined based on the minimum and/or maximum angular velocities at which the electric motor, which is associated with the pump, may be operated. The curves 1406 and 1408 are power curves and may be derived from the power available to the bottomhole assembly 100 and/or the LWD tool 200. The curve 1406 is associated with a first drilling fluid circulation rate and curve 1408 is associated with a second drilling fluid circulation rate. In operation, the power is generated via the turbine that is exposed to the drilling fluid which circulates in the borehole 11.

Curve 1416 shows the power limitation based on drilling fluid invasion into the formation. Curve 1416 may be derived from the wellbore hydraulics simulator 302, the mudcake simulator 304 and/or the formation flow simulator 306. In operation, the wellbore hydraulics simulator 302, the mudcake simulator 304 and/or the formation flow simulator 306 may be utilized to determine the impact of the rate of the drilling fluid circulation in the borehole 11 on the invasion of the drilling fluid in the formation. For example, if the drilling fluid circulation rate is relatively high, the mudcake typically grows relatively slowly or erodes relatively quickly and, thus, the infiltration may be higher. Thus, the wellbore hydraulics simulator 302, the mudcake simulator 304 and/or the formation flow simulator 306 may be utilized to identify an optimal pumping rate that limits the infiltration rate to obtain a quality fluid sample in a particular time. In the graph 1400, an optimal pumping rate 1418 is, in this example, the intersection between the curve 1416 (e.g., power limited by filtration) and a curve 1420 (e.g., a formation response curve), which is described below.

Curve 1420 is a formation response curve, which depends on a mobility of the formation, a mobility ratio between the drilling fluid filtrate and the different fluids in the formation (e.g., water, oil, gas, etc.) and/or non-linear effects due, at least in part, to viscosity, fluid density and the velocity of the formation fluid being sampled. The curve 1416 may be generated by the tool response simulator 308. The mobility of the formation may be determined, for example, during a preliminary test process, during a sampling process, from openhole logs (e.g., NMR log) or from data acquired in offset wells.

Figure 15:
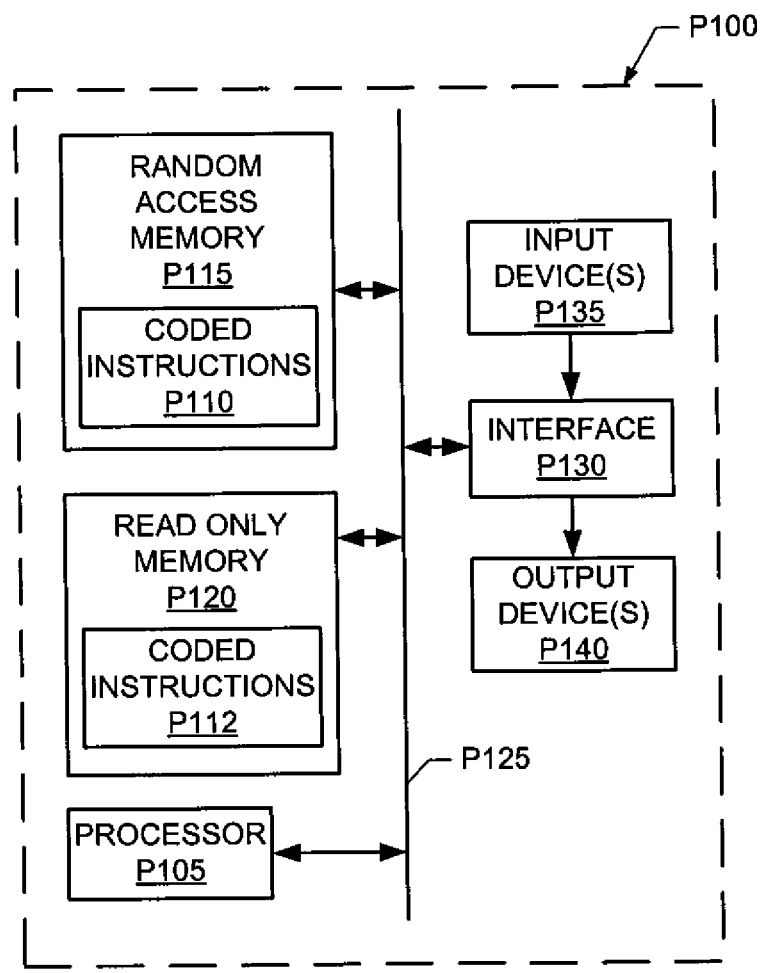
FIG. 15 is a schematic view of an apparatus according to one or more aspects of the present disclosure.

FIG. 15 is a schematic diagram of an example processor platform P100 that may be used and/or programmed to implement the logging and control computer 160, the processing unit 250, the processor 316 and/or the simulation engine 240. For example, the processor platform P100 can be implemented by one or more general purpose processors, processor cores, microcontrollers, etc.

The processor platform P100 of the example of FIG. 15 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

In view of the above and the figures, it should be clear that the present disclosure introduces a method of planning a sampling operation for a subterranean formation that may involve identifying a plurality of processes and related parameters, where the processes include drilling and sampling processes and the related parameters including drilling and sampling parameters. The method may also involve processing the parameters for each of the processes via a simulation engine to generate predictions associated with sampling the formation, where the simulation engine may include at least one of a wellbore hydraulics simulator, a mudcake simulator, a formation flow simulator, or a tool response simulator. The method may further involve ranking the predictions associated with sampling the formation based on at least one of a sample fluid quality, a sampling process duration, a sampling process efficiency or a cost of sampling, and planning the sampling operation based on the ranked predictions.

The present disclosure also introduces a method of controlling a subterranean formation sampling operation that may involve testing the formation to be sampled, measuring a response of the formation to the testing, determining mudcake and formation parameters based on the response of the formation, processing the mudcake and formation parameters via a simulation engine to generate simulation outputs, determining sampling parameters based on the simulation outputs, and controlling the subterranean formation sampling operation based on the sampling parameters.

The present disclosure also introduces a method of controlling a drilling operation that may involve performing a sampling process on a subterranean formation, measuring an actual response of the formation to the sampling process, calculating via a simulation engine a theoretical response of the formation to the sampling process, comparing the actual response to the theoretical response, adjusting at least one of a formation property or a drilling fluid property based on the comparison, and controlling the drilling operation based on at least one of the adjusted formation property or the adjusted drilling fluid property to improve the sampling process The present disclosure also introduces a method of controlling a sampling while drilling operation that may involve measuring drilling and sampling parameters during the sampling while drilling operation, processing the measured drilling and sampling parameters with a simulator to update simulator outputs, and controlling the sampling while drilling operation in real time based on the updated simulator outputs.

The present disclosure also introduces a method of performing a sampling while drilling operation that may involve planning the sampling while drilling operation with a simulator, wherein the planning comprises determining drilling and sampling parameters based on simulator output data obtained prior to initiating the sampling while drilling operation. The method may also involve controlling in real time a sampling process of the sampling while drilling operation with the simulator by updating the simulator input data based on data obtained during at least one of the sampling process or during a drilling process performed during the sampling while drilling operation. Still further, the method may involve controlling in real time the drilling process with the simulator to improve the sampling process by updating the simulator input data based on data obtained during the sampling process or the drilling process.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of planning a sampling operation for a subterranean formation, comprising:
    identifying a plurality of processes and related parameters, the processes including drilling and sampling processes and the related parameters including drilling and sampling parameters;
    processing the parameters for each of the processes via a simulation engine to generate predictions associated with sampling the formation, the simulation engine including at least one of a wellbore hydraulics simulator, a mudcake simulator, a formation flow simulator, or a tool response simulator;
    ranking the predictions associated with sampling the formation based on at least one of a sample fluid quality, a sampling process duration, a sampling process efficiency, or a cost of sampling; and
    planning the sampling operation based on the ranked predictions.

2. The method of claim 1 wherein:
    the related parameters comprise at least one of a drilling fluid property, a drilling fluid flow rate history, a bottomhole assembly configuration, a sample fluid property, a formation property, a duration of a sampling operation, a sample fluid flow rate history, a time at which a sample is to be acquired, process parameters, or reservoir parameters; and
    ranking the predictions comprises determining the impact of each of the related parameters on at least one of the sample fluid quality, the sampling process duration, the sampling process efficiency, or the cost of sampling.

3. The method of claim 1 further comprising measuring parameters while drilling to update a drilling operation in real time.

4. The method of claim 1 further comprising:
    obtaining actual measurements associated with sampling the formation and performing a test operation to obtain actual measurements from the subterranean formation; and
    updating the sampling operation based on the actual measurements.

5. The method of claim 1 further comprising:
    obtaining actual measurements associated with sampling the formation and performing a test operation to obtain actual measurements from the subterranean formation; and
    comparing the actual measurements to the predictions to identify tool failures, comparing the actual measurements to the predictions to update the related parameters, and updating the related parameters based on the actual measurements to improve an efficiency of the sampling operation.

6. The method of claim 1 further comprising:
    obtaining actual measurements associated with sampling the formation and performing a test operation to obtain actual measurements from the subterranean formation; and
    processing the actual measurements via the simulation engine to generate a model to predict at least one of formation properties, mudcake properties, or sampled fluid properties, and updating a drilling operation based on at least one of the formation properties, the mudcake properties, or the sampled fluid properties.

7. The method of claim 1 wherein:
    the plurality of processes includes at least a first scenario and a second scenario;
    the first scenario is associated with at least one of simulating a first efficiency of a first sampling process when a sampling tool is relatively close to a drill bit, with a first stabilizer configuration, or after drilling; and
    the second scenario is associated with at least one of simulating a second efficiency of a second sampling process when the sampling tool is relatively far from the drill bit, with a second stabilizer configuration, after drilling, or while tripping a bottomhole assembly out of a wellbore.

8. The method of claim 1 wherein:
    the plurality of processes includes at least a first scenario and a second scenario;
    the first scenario is associated with at least one of simulating a first efficiency of a first sampling process utilizing a first drilling fluid, while drilling, utilizing a first drilling fluid flow rate history, or using a first sample fluid flow rate history; and
    the second scenario is associated with at least one of simulating a second efficiency of a second sampling process utilizing a second drilling fluid, utilizing a wireline tool, utilizing a second drilling fluid flow rate history, or using a second sample fluid flow rate history.

* * * * *